US012286307B2

(12) United States Patent
Bellar et al.

(10) Patent No.: US 12,286,307 B2
(45) Date of Patent: *Apr. 29, 2025

(54) CONVEYOR SYSTEMS AND METHODS FOR SORTING MERCHANDISE USING INTERCHANGEABLE AND ASSIGNABLE SORTATION MODULES

(71) Applicant: Walmart Apollo, LLC, Bentonville, AR (US)

(72) Inventors: Jason D. Bellar, Bella Vista, AR (US); William Mark Propes, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,866

(22) Filed: Dec. 11, 2023

(65) Prior Publication Data

US 2024/0101359 A1    Mar. 28, 2024

Related U.S. Application Data

(63) Continuation of application No. 17/072,529, filed on Oct. 16, 2020, now Pat. No. 11,878,862, which is a
(Continued)

(51) Int. Cl.
*B65G 43/08* (2006.01)
*B07C 3/00* (2006.01)
(Continued)

(52) U.S. Cl.
CPC .............. *B65G 43/08* (2013.01); *B07C 3/003* (2013.01); *B07C 3/006* (2013.01); *B07C 3/08* (2013.01);
(Continued)

(58) Field of Classification Search
None
See application file for complete search history.

(56) References Cited

U.S. PATENT DOCUMENTS 3,456,773 A    7/1969   Titmas, Jr.
3,613,910 A    10/1971  Weir
(Continued)

FOREIGN PATENT DOCUMENTS

CA    3122065    6/2019
GB    2565017    1/2019
(Continued)

OTHER PUBLICATIONS

U.S. Appl. No. 62/456,085, filed Mar. 2, 2017, Robert James Taylor.
(Continued)

*Primary Examiner* — Kyle O Logan
(74) *Attorney, Agent, or Firm* — Fitch, Even, Tabin & Flannery LLP

(57) ABSTRACT

There is provided a conveyor assembly for sorting merchandise items. In one form, the conveyor assembly includes: a merchandise identification module; sortation modules each comprising a multi-directional sorting portion with two sets of rollers, a first wing including a third set of rollers, a second wing including a fourth set of rollers, and a controller configured to receive an IP address; a first, disassembled state of the sortation modules; a second, assembled state of the sortation modules; a merchandise database; and a control circuit configured to receive identifying information about an unsorted merchandise item, assign a unique IP address to each sortation module corresponding to the position of the sortation module, determine a sortation destination for the unsorted merchandise item, determine the sortation module corresponding to the sortation destination; and instruct the
(Continued)

controller of the corresponding sortation module to divert the unsorted merchandise item to the sortation destination.

20 Claims, 12 Drawing Sheets

Related U.S. Application Data continuation of application No. 16/751,384, filed on Jan. 24, 2020, now Pat. No. 10,835,928.

(60) Provisional application No. 62/797,061, filed on Jan. 25, 2019.

(51) Int. Cl.
*B07C 3/08* (2006.01)
*B07C 3/14* (2006.01)
*B07C 3/18* (2006.01)
*B07C 5/36* (2006.01)
*B65G 13/02* (2006.01)
*B65G 37/00* (2006.01)
*B65G 47/71* (2006.01)
*G05B 19/418* (2006.01)
*G06K 7/10* (2006.01)

(52) U.S. Cl.
CPC ............... *B07C 3/14* (2013.01); *B07C 3/18* (2013.01); *B07C 5/361* (2013.01); *B07C 5/367* (2013.01); *B65G 13/02* (2013.01); *B65G 37/00* (2013.01); *B65G 47/71* (2013.01); *G05B 19/418* (2013.01); *G05B 19/4189* (2013.01); *B65G 2203/044* (2013.01); *G06K 2007/10504* (2013.01)

(56) References Cited

U.S. PATENT DOCUMENTS

| | | |
|---|---|---|
| 3,621,973 A | 11/1971 | Carlson |
| 3,771,679 A | 11/1973 | Theml |
| 4,509,636 A | 4/1985 | Godbois |
| 4,798,275 A | 1/1989 | Leemkuil |
| 4,832,204 A | 5/1989 | Handy |
| 4,962,841 A | 10/1990 | Kloosterhouse |
| 4,988,435 A | 1/1991 | Kimura |
| 5,188,210 A | 2/1993 | Malow |
| 5,238,349 A | 8/1993 | Grace, Sr. |
| 5,456,347 A | 10/1995 | Best |
| 5,471,311 A | 11/1995 | Van Den Bergh |
| 5,501,571 A | 3/1996 | Van Durrett |
| 5,687,850 A | 11/1997 | Speckhart |
| 5,743,375 A | 4/1998 | Shyr |
| 5,779,023 A | 7/1998 | Hidai |
| 5,783,810 A | 7/1998 | Kelly |
| 5,793,633 A | 8/1998 | Noguchi |
| 5,921,378 A | 7/1999 | Bonnet |
| 5,984,078 A | 11/1999 | Bonnet |
| 6,005,211 A | 12/1999 | Huang |
| 6,230,872 B1 | 5/2001 | Huang |
| 6,471,044 B1 | 10/2002 | Isaacs |
| 6,505,733 B2 | 1/2003 | Troupos |
| 6,554,123 B2 | 4/2003 | Bonnet |
| 6,644,459 B2 | 11/2003 | Van Leeuwen |
| 6,697,702 B1 | 2/2004 | Hahn-Carlson |
| 7,118,034 B2 | 10/2006 | Baldassari |
| 7,212,884 B2 | 5/2007 | Kappelgaar |
| 7,221,276 B2 | 5/2007 | Olsen |
| RE39,747 E | 7/2007 | Lankin |
| 7,331,471 B1 | 2/2008 | Shakes |
| 7,426,484 B2 | 9/2008 | Joyce |
| 7,668,779 B2 | 2/2010 | DeWitt |
| 7,695,235 B1 | 4/2010 | Rallis |
| 7,819,260 B2 | 10/2010 | Leimbach |
| 7,909,155 B2 | 3/2011 | Lupton |
| 7,938,315 B2 | 5/2011 | Marks |
| 7,984,809 B1 | 7/2011 | Ramey |
| 8,060,243 B2 | 11/2011 | Ogawa |
| 8,096,402 B2 | 1/2012 | Chastain |
| 8,186,499 B2 | 5/2012 | Brandt |
| 8,284,993 B2 | 10/2012 | Taylor |
| 8,464,947 B2 | 6/2013 | Swan |
| 8,489,232 B2* | 7/2013 | Mishra ............... H04N 7/18 235/384 |
| 8,575,507 B2 | 11/2013 | Pippin |
| 8,655,484 B2 | 2/2014 | Stoll |
| 8,684,169 B2 | 4/2014 | Itoh |
| 8,738,177 B2 | 5/2014 | Van Ooyen |
| 8,757,363 B2 | 6/2014 | Combs |
| 8,855,806 B2 | 10/2014 | Hara |
| 8,924,272 B2 | 12/2014 | Venkatasubramanian |
| 8,949,148 B2 | 2/2015 | Kumar |
| 9,004,287 B2 | 4/2015 | Liedl |
| 9,010,654 B2 | 4/2015 | Bell |
| 9,020,634 B2 | 4/2015 | Bailey |
| 9,035,210 B1 | 5/2015 | Davis |
| 9,141,928 B2 | 9/2015 | Pothukuchi |
| 9,216,857 B1 | 12/2015 | Kalyan |
| 9,275,293 B2 | 3/2016 | Broache |
| 9,290,333 B2 | 3/2016 | Skanse |
| 9,336,510 B2 | 5/2016 | Dearing |
| 9,422,116 B1 | 8/2016 | Hase |
| 9,475,653 B2 | 10/2016 | Dugat |
| 9,827,598 B2 | 11/2017 | Robbins |
| 10,087,002 B2 | 10/2018 | Shields |
| 10,303,987 B2 | 5/2019 | Kotula |
| 10,507,975 B2 | 12/2019 | Thomas |
| 10,657,341 B2 | 5/2020 | Wilkinson |
| 10,661,311 B2 | 5/2020 | Winkle |
| 10,773,897 B2* | 9/2020 | Schroader ............. B65G 47/54 |
| 10,810,534 B2 | 10/2020 | Taylor |
| 10,835,928 B2 | 11/2020 | Bellar |
| 10,906,746 B2* | 2/2021 | Schroader ......... B65G 47/1492 |
| 11,531,953 B2 | 12/2022 | Taylor |
| 11,868,947 B2 | 1/2024 | Taylor |
| 11,878,862 B2 | 1/2024 | Bellar |
| 2002/0084173 A1 | 7/2002 | Paquette |
| 2002/0092734 A1 | 7/2002 | Troupos |
| 2003/0106771 A1 | 6/2003 | Takizawa |
| 2003/0111320 A1 | 6/2003 | Van Leeuwen |
| 2004/0069849 A1 | 4/2004 | Stevens |
| 2004/0073333 A1 | 4/2004 | Brill |
| 2004/0098272 A1 | 5/2004 | Kapsis |
| 2004/0174244 A1 | 9/2004 | Eidemiller |
| 2004/0243452 A1 | 12/2004 | Barton |
| 2007/0000990 A1 | 1/2007 | Baldassari |
| 2007/0261941 A1 | 11/2007 | Pelak |
| 2008/0023302 A1 | 1/2008 | Groom |
| 2008/0169170 A1 | 7/2008 | Brommer |
| 2008/0169171 A1 | 7/2008 | Itoh |
| 2009/0008450 A1 | 1/2009 | Ebert |
| 2009/0043594 A1 | 2/2009 | Tseng |
| 2009/0145723 A1 | 6/2009 | Ogawa |
| 2009/0272624 A1 | 11/2009 | Edwards |
| 2009/0294253 A1 | 12/2009 | Eisenberg |
| 2010/0005011 A1 | 1/2010 | Dewey |
| 2010/0322473 A1 | 12/2010 | Taylor |
| 2011/0303564 A1 | 12/2011 | Pearson |
| 2012/0101956 A1 | 4/2012 | Hyre |
| 2012/0209741 A1 | 8/2012 | Bonner |
| 2012/0259655 A1 | 10/2012 | Madreperla |
| 2012/0290126 A1* | 11/2012 | Combs ............... G05B 19/4189 198/781.01 |
| 2014/0100769 A1 | 4/2014 | Wurman |
| 2014/0121826 A1* | 5/2014 | Kreitmeier ............... B07C 3/00 700/223 |
| 2014/0258165 A1 | 9/2014 | Heil |
| 2014/0262684 A1 | 9/2014 | Skanse |
| 2014/0279272 A1 | 9/2014 | Inman |
| 2015/0144536 A1 | 5/2015 | Dugat |
| 2015/0210484 A1 | 7/2015 | Itoh |
| 2015/0259156 A1 | 9/2015 | Henry |
| 2016/0083196 A1 | 3/2016 | Dugat |

(56) References Cited

U.S. PATENT DOCUMENTS

| | | | |
|---|---|---|---|
| 2016/0221766 A1 | 8/2016 | Schroader | |
| 2016/0221768 A1 | 8/2016 | Kadaba | |
| 2016/0232479 A1 | 8/2016 | Skaaksrud | |
| 2016/0275441 A1 | 9/2016 | Barber | |
| 2016/0318714 A1 | 11/2016 | Reischl | |
| 2016/0342917 A1 | 11/2016 | Surapaneni | |
| 2017/0057756 A1 | 3/2017 | Dugat | |
| 2017/0091705 A1 | 3/2017 | Jones | |
| 2017/0137230 A1* | 5/2017 | Combs | B65G 23/08 |
| 2017/0203335 A1* | 7/2017 | Benyoub | G06V 30/224 |
| 2017/0330135 A1* | 11/2017 | Taylor | G06Q 10/08 |
| 2017/0357937 A1 | 12/2017 | Edens | |
| 2018/0036772 A1* | 2/2018 | Pano | B07C 3/14 |
| 2018/0085788 A1* | 3/2018 | Engel | B07C 1/025 |
| 2018/0186577 A1 | 7/2018 | Messina | |
| 2018/0224837 A1 | 8/2018 | Enssle | |
| 2018/0253683 A1 | 9/2018 | Taylor | |
| 2018/0257872 A1 | 9/2018 | Kuhn | |
| 2018/0257873 A1 | 9/2018 | Aljoe | |
| 2018/0339865 A1* | 11/2018 | Schroader | G06V 20/52 |
| 2019/0031557 A1 | 1/2019 | Cela Greven | |
| 2019/0210814 A1* | 7/2019 | Combs | B65G 43/00 |
| 2019/0270197 A1 | 9/2019 | Wagner | |
| 2019/0315574 A1 | 10/2019 | Mehendale | |
| 2019/0370745 A1 | 12/2019 | Bellar | |
| 2020/0122928 A1 | 4/2020 | Bellar | |
| 2020/0179981 A1 | 6/2020 | Bellar | |
| 2020/0189852 A1 | 6/2020 | Karol | |
| 2020/0189853 A1 | 6/2020 | Karol | |
| 2020/0238339 A1 | 7/2020 | Bellar | |
| 2021/0031238 A1 | 2/2021 | Bellar | |
| 2023/0079572 A1 | 3/2023 | Taylor | |

FOREIGN PATENT DOCUMENTS

| | | |
|---|---|---|
| GB | 2595400 | 11/2021 |
| GB | 2596431 | 12/2021 |
| WO | 2000000300 | 1/2000 |
| WO | 2005002747 | 1/2005 |
| WO | 2017196916 | 11/2017 |
| WO | 2020118171 | 6/2020 |

OTHER PUBLICATIONS

"Conveyors"; Superior Racking and Shelving Ltd.; http://superiorracking.ie/conveyors/; pp. 1-2.
"Dimensioning, Weighing & Scanning—Buyer's Guide"; Mettler-Toledo Cargosan; published in 2014; pp. 1-52.
Aruna, Y. V. et al.: "Automatic convey or System with In-Process Sorting Mechanism using PLC and HMI System"; Int. Journal of Engineering Research and Applications; vol. 5, Issue 11, (Part-3); published Nov. 2015; pp. 37-42.
Belgianpost; "Taxipost: Automated Parcels Sorting—English"; https://www.youtube.com/watch?v=vN9XRIAys38; published Sep. 30, 2009; pp. 1-6.
Bytronic; "Single Conveyor Unit"; Bytronic Educational Technology; pp. 1-2.
Dabade, Sanjay, et al.; "Automatic Sorting Machine Using Conveyor Belt"; International Journal of Innovative and Emerging Research in Engineering; vol. 2, Issue 5; published in 2015; pp. 66-70.
G. Black and V. Vyatkin, "Intelligent Component-Based Automation of Baggage Handling Systems With IEC 61499," in IEEE Transactions on Automation Science and Engineering, vol. 7, No. 2, pp. 337-351, Apr. 2010, doi: 10.1109/TASE.2008.2007216. ( Year: 2010).
Hayslip, Nunzio. A Reconfigurable Simulator for Coupled Conveyors. Diss. University of Akron, 2006. (Year: 2006).
Jones, Douglas; "Automated Receiving, Saving Money at the Dock Door"; Accu☐Sort Systems Inc.; pp. 1-11.
Mayer, Stephan H. "Development of a completely decentralized control system for modular continuous conveyors." Apr. 1, 2009. University of Karlsruhe, pp. 1-122. (Year: 2009).
Oladapo, Bankole, et al.; "Model design and simulation of automatic sorting machine using proximity sensor"; Engineering Science and Technology, an International Journal; publsihed May 9, 2016; pp. 1452-1456.
PCT; App No. PCT/US19/64915; International Search Report and Written Opinion mailed Feb. 25, 2020.
PCT; App. No. PCT/US2019/064915; International Search Report and Written Opinion mailed Jun. 17, 2021.
PCT; App. No. PCT/US2020/014878; International Search Report and Written Opinion mailed Apr. 8, 2020.
PCT; PCT App. No. PCT/US2017/031867; International Search Report and Written Opinion mailed on Aug. 11, 2017.
Pulse Roller; ConveyLinx-Ai2 User's Guide Version 1.5; https://www.pulseroller.com/files/AS/Control%20Literature%20&%20Drawings/ConveyLinx%20Ai/Users%20Manual%20and%20Specifications/Users%20Guide.pdf; Jul. 2019; pp. 1-124.
Seibold, Zazilia et al.; "Layout-Optimized Sorting of Goods with Decentralized Controlled Conveying Modules"; Institute for Material Handling and Logistics, Karlsruhe Institute of Technology; pp. 1-6.
Tripathi, Anoop; "Warehouse Conveyor"; https://www.youtube.com/watch?v=QMdmmB_6PrQ; published Oct. 24, 2013; pp. 1-5.
UKIPO; App No. GB2112112.4; Examination Report mailed Jan. 16, 2023; 6 pages.
UKIPO; App No. GB2112112.4; Examination Report mailed Jun. 10, 2022; 4 pages.
UKIPO; App No. GB2112112.4; Examination Report mailed Oct. 31, 2022; 5 pages.
UKIPO; App No. GB2112112.4; Examination Report mailed Sep. 2, 2022; 4 pages.
U.S. Appl. No. 15/591,499; Notice of Allowance mailed Jun. 18, 2020, (pp. 1-9).
U.S. Appl. No. 15/591,499; Office Action mailed Feb. 3, 2020; (pp. 1-24).
U.S. Appl. No. 15/591,499; Office Action mailed Aug. 6, 2019; (pp. 1-26).
U.S. Appl. No. 16/706,310; Final Rejection mailed Jun. 22, 2022; (pp. 1-13).
U.S. Appl. No. 16/706,310; Non-Final Rejection mailed Feb. 23, 2022; (pp. 1-21).
U.S. Appl. No. 16/751,384; Notice of Allowance mailed Jul. 24, 2020; (5 pages).
U.S. Appl. No. 16/706,310; Final Rejection mailed Mar. 29, 2023; (pp. 1-18).
U.S. Appl. No. 16/706,310; Final Rejection mailed Nov. 22, 2023; (pp. 1-21).
U.S. Appl. No. 16/706,310; Non-Final Rejection mailed Nov. 15, 2022; (pp. 1-17).
U.S. Appl. No. 17/025,606; Non-Final Rejection mailed May 6, 2022; (pp. 1-6).
U.S. Appl. No. 17/025,606; Notice of Allowance and Fees Due (PTOL-85) mailed Aug. 22, 2022; (pp. 1-7).
U.S. Appl. No. 17/072,529; Notice of Allowance and Fees Due (PTOL-85) mailed Sep. 5, 2023; (pp. 1-9).
U.S. Appl. No. 17/988,443; Non-Final Rejection mailed May 22, 2023; (pp. 1-7).
U.S. Appl. No. 17/988,443; Notice of Allowance and Fees Due (PTOL-85) mailed Aug. 28, 2023; (pp. 1-8).
Vaughan, Mark; "Conveyor Sortation Systems"; http://www.plantengineering.com/search/searchsingledisplay/conveyorsortationsystems/df9a8557f0.html; published on Sep. 1, 1999; pp. 1-6.
Viscon; "Viscon Logistics—Sorting Systems"; https://www.youtube.com/watch?v=O00gDoGXN98; published on Sep. 18, 2014; pp. 1-5.
U.S. Appl. No. 16/706,310; Non-Final Rejection mailed Jul. 2, 2024; (pp. 1-16).
U.S. Appl. No. 18/521,740; Non-Final Rejection mailed Jun. 7, 2024; (pp. 1-19).

* cited by examiner

CONVEYOR SYSTEMS AND METHODS FOR SORTING MERCHANDISE USING INTERCHANGEABLE AND ASSIGNABLE SORTATION MODULES

CROSS-REFERENCE TO RELATED APPLICATIONS

This application is a continuation of U.S. application Ser. No. 17/072,529, filed Oct. 16, 2020, which is a continuation of U.S. application Ser. No. 16/751,384, filed Jan. 24, 2020, which claims the benefit of U.S. Provisional Application No. 62/797,061, filed Jan. 25, 2019, which are all incorporated by reference in their entirety herein.

TECHNICAL FIELD

This invention relates generally to conveyor assemblies, and more particularly, to conveyor assemblies composed of interchangeable and assignable sortation modules.

BACKGROUND

In the retail setting, shipments of merchandise are constantly being received at shopping facilities and merchandise distribution centers. The merchandise items that are received need to be quickly and efficiently sorted into various desired categories by a conveyor assembly. In turn, the sorted items can then be transported to an appropriate location within the shopping facility and merchandise distribution center, such as to designated shelving.

The merchandise receiving areas of different shopping facilities and merchandise distribution centers, however, often have different sizes and dimensions that may make it difficult to accommodate a large, fixed conveyor assembly. It would be desirable to provide a modular conveyor assembly that can be readily assembled to a desired configuration when a shipment arrives and then readily disassembled and stored following the sortation process. Further, it would be desirable to provide a conveyor assembly composed of sortation modules that can each be readily interchanged, replaced, and reconfigured within a conveyor assembly chain and that can each be assigned defined positions within the chain.

BRIEF DESCRIPTION OF THE DRAWINGS

Disclosed herein are embodiments of systems, apparatuses and methods using a conveyor assembly to sort merchandise. This description includes drawings, wherein.

Figure 1:
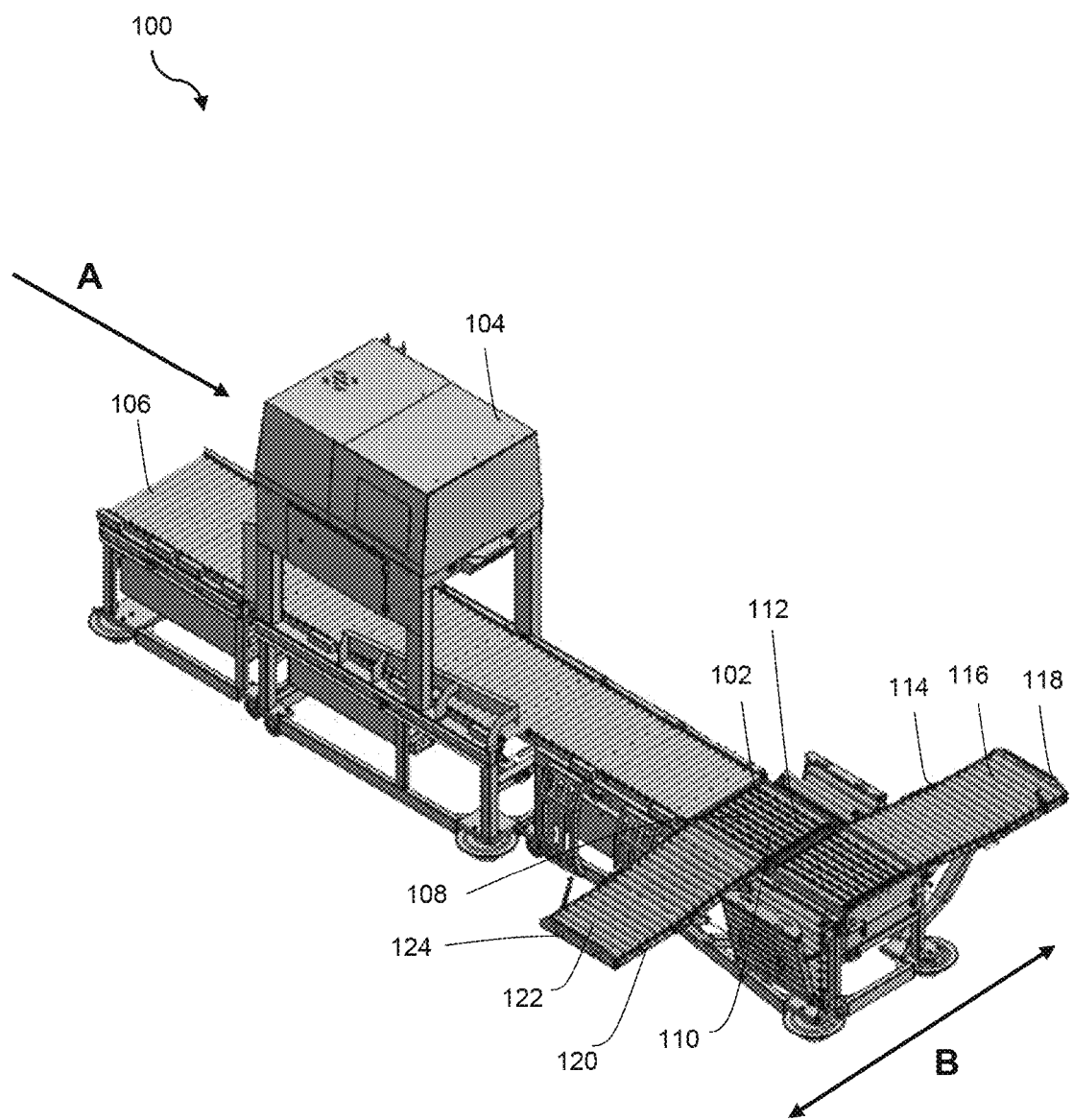
FIG. 1 is a perspective view of a conveyor assembly in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein using a conveyor assembly useful for sorting merchandise items. In one form, the conveyor assembly comprises: a merchandise identification module configured to receive identifying information about merchandise items to be sorted by the conveyor assembly; a plurality of sortation modules for moving and sorting the merchandise items, each sortation module comprising: a multi-directional sorting portion with a first set of rollers configured to propel merchandise items in a first direction and a second set of rollers configured to divert merchandise items in a second direction; a first wing adjacent the sorting portion and comprising a third set of rollers configured to divert merchandise items to a first sortation destination; a second wing adjacent the sorting portion and comprising a fourth set of rollers configured to divert merchandise items to a second sortation destination; a controller operatively coupled to the second set of rollers and configured to divert merchandise items along one of the first and second wings to the first and second sortation destinations, respectively, the controller configured to receive an Internet Protocol (IP) address corresponding to the sortation module; a first, disassembled state of the plurality of sortation modules in which at least one of the plurality of sortation modules is not linked to another sortation module; a second, assembled state of the plurality of sortation modules in which the sortation modules are coupled to one another to define a chain of sortation modules; a merchandise database with a record corresponding to merchandise items to be sorted; and a control circuit communicatively coupled to the merchandise identification module, the controller of each sortation module, and the merchandise database, the control circuit configured to: receive identifying information about an unsorted merchandise item to be sorted by the conveyor assembly from the merchandise identification module; assign a unique IP address to each sortation module, each IP address corresponding to a position of each sortation module in the chain of sortation modules when in the second, assembled state; determine a sortation destination for the unsorted merchandise item to be sorted by the conveyor assembly based on the merchandise database; determine the sortation module corresponding to the determined sortation destination; and instruct the controller of the sortation module corresponding to the determined sortation destination to energize the second set of rollers to divert the unsorted merchandise item to the determined sortation destination.

In some implementations, in the conveyor assembly, at least one roller of the first set of rollers is a motor powered roller and at least one roller of the second set of rollers is a motor powered roller. In some implementations, the controller of each sortation module comprises a first roller motor control portion and a second roller motor control portion; the first roller motor control portion configured to control rotation of at least one of the second set of rollers in a clockwise direction to divert merchandise items along the first wing to the first sortation destination; and the second roller motor control portion configured to control rotation of at least one of the second set of rollers in a counterclockwise direction to divert merchandise items along the second wing to the second sortation destination. In some implementations, the control circuit is configured to assign the unique IP addresses to the sortation modules in ascending or descending sequential order as one proceeds downstream from the merchandise identification module. In some implementations, the conveyor assembly further comprises: a third, assembled state in which the plurality of sortation modules have been reconfigured to different positions in the chain of sortation modules; the control circuit assigning a new IP address to each sortation module depending on the sortation module's new position in the chain of sortation modules. In some implementations, the conveyor assembly further comprises: a fourth, assembled state in which one of the plurality of sortation modules in the chain of sortation modules has been replaced with a new sortation module; a controller of the new sortation module receiving a new IP address corresponding to the new sortation module's position in the chain of sortation modules. In some implementations, the control circuit and the controllers of the sortation modules are configured to communicate with one another to determine the number and relative positions of the sortation modules in the chain with respect to one another. In some implementations, the merchandise database contains one or more predetermined characteristics of merchandise items to be sorted; the control circuit assigns the sortation destination for the unsorted merchandise item to be sorted based on the one or more predetermined characteristics. In some implementations, the merchandise identification module comprises a scan tunnel or arm positioned above or adjacent an input set of rollers to the conveyor assembly; and the control circuit is disposed in the scan tunnel or arm. In some implementations, the conveyor assembly further comprises: a non-sortation destination configured to receive an unsorted merchandise item that could not be identified by the merchandise identification module or that could not be located in the merchandise database.

In another form, there is provided a method for sorting merchandise items using a conveyor assembly, the method comprising: by a merchandise identification module, receiving identifying information about merchandise items to be sorted by the conveyor assembly; providing a plurality of sortation modules for moving and sorting the merchandise items, each sortation module comprising: a multi-directional sorting portion with a first set of rollers configured to propel merchandise items in a first direction and a second set of rollers configured to divert merchandise items in a second direction; a first wing adjacent the sorting portion and comprising a third set of rollers configured to divert merchandise items to a first sortation destination; a second wing adjacent the sorting portion and comprising a fourth set of rollers configured to divert merchandise items to a second sortation destination; a controller operatively coupled to the second set of rollers and configured to divert merchandise items along one of the first and second wings to the first and second sortation destinations, respectively, the controller configured to receive an Internet Protocol (IP) address corresponding to the sortation module; coupling the plurality of sortation modules to one another to define a chain of sortation modules; storing records in a merchandise database corresponding to merchandise items to be sorted; and by a control circuit: receiving identifying information about an unsorted merchandise item to be sorted by the conveyor assembly from the merchandise identification module; assigning a unique IP address to each sortation module, each IP address corresponding to a position of each sortation module in the chain of sortation modules when in the second, assembled state; determining a sortation destination for the unsorted merchandise item to be sorted by the conveyor assembly based on the merchandise database; determining the sortation module corresponding to the determined sortation destination; and instructing the controller of the sortation module corresponding to the determined sortation destination to energize the second set of rollers to divert the unsorted merchandise item to the determined sortation destination.

In another form, there is provided a system for receiving and sorting merchandise items shipped to a shopping facility, the system comprising: a shopping facility containing a plurality of merchandise items; a delivery of merchandise items received at the shopping facility; a delivery location at the shopping facility configured to receive the delivery of merchandise items; and a conveyor assembly at the delivery location, the conveyor assembly comprising: a merchandise identification module configured to receive identifying information about merchandise items to be sorted by the conveyor assembly; a plurality of sortation modules for moving and sorting the merchandise items, each sortation module comprising: a multi-directional sorting portion with a first set of rollers configured to propel merchandise items in a first direction and a second set of rollers configured to divert merchandise items in a second direction; a first wing adjacent the sorting portion and comprising a third set of rollers configured to divert merchandise items to a first sortation destination; a second wing adjacent the sorting portion and comprising a fourth set of rollers configured to divert merchandise items to a second sortation destination; a controller operatively coupled to the second set of rollers and configured to divert merchandise items along one of the first and second wings to the first and second sortation destinations, respectively, the controller configured to receive an Internet Protocol (IP) address corresponding to the sortation module; a first, disassembled state of the plurality of sortation modules in which at least one of the plurality of sortation modules is not linked to another sortation module; a second, assembled state of the plurality of sortation modules in which the sortation modules are coupled to one another to define a chain of sortation modules; a merchandise database with a record corresponding to merchandise items to be sorted; a control circuit communicatively coupled to the merchandise identification module, the controller of each sortation module, and the merchandise database, the control circuit configured to: receive identifying information about an unsorted merchandise item to be sorted by the conveyor assembly from the merchandise identification module; assign a unique IP address to each sortation module, each IP address corresponding to a position of each sortation module in the chain of sortation modules when in the second, assembled state; determine a sortation destination for the unsorted merchandise item to be sorted by the conveyor assembly based on the merchandise database; determine the sortation module corresponding to the determined sortation destination; and instruct the controller of the sortation module corresponding to the determined sortation destination to energize the second set of rollers to divert the unsorted merchandise item to the determined sortation destination.

Figure 2:
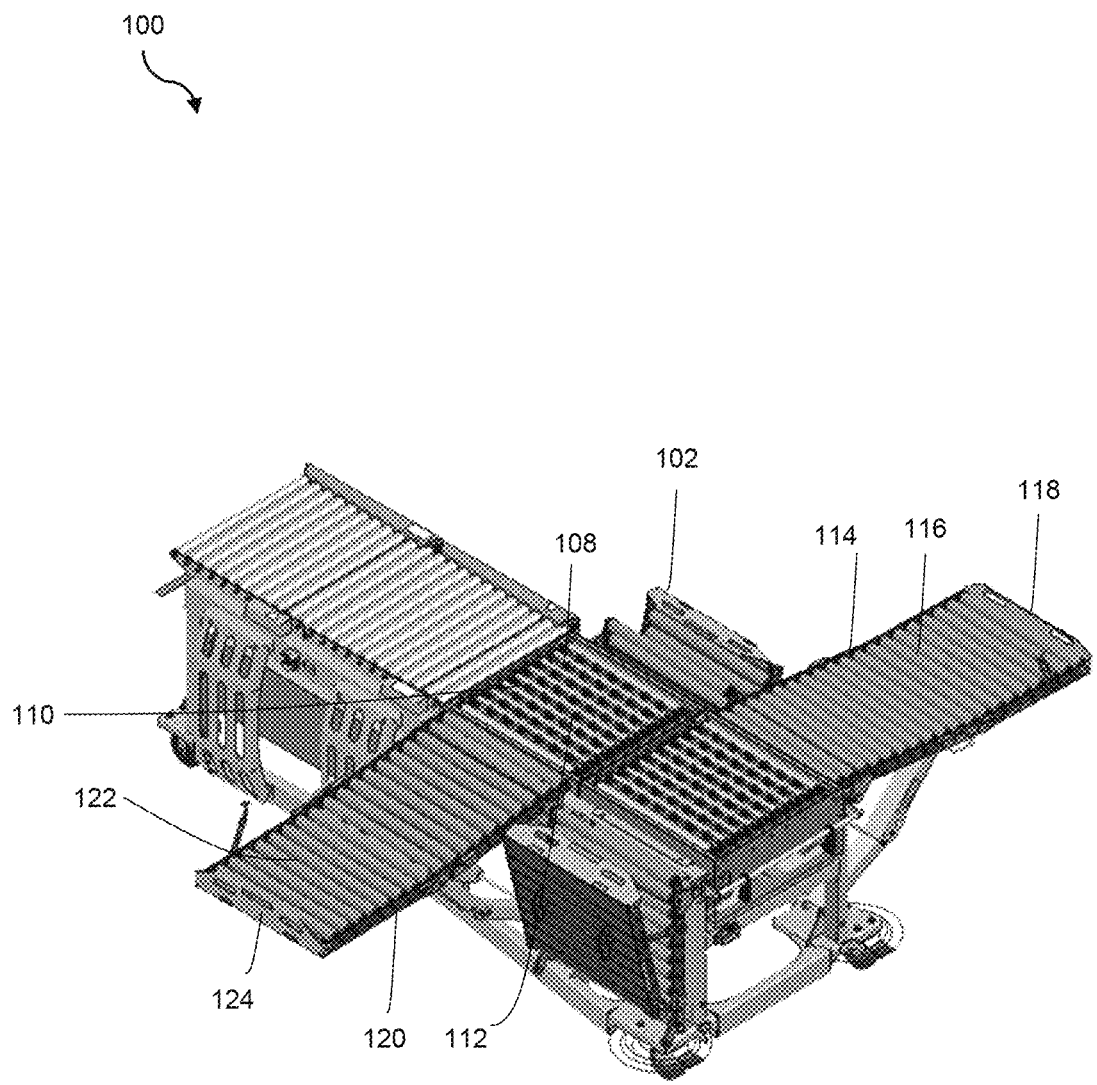
FIG. 2 is an enlarged perspective view of a portion of the conveyor assembly of FIG. 1.
Figure 3:
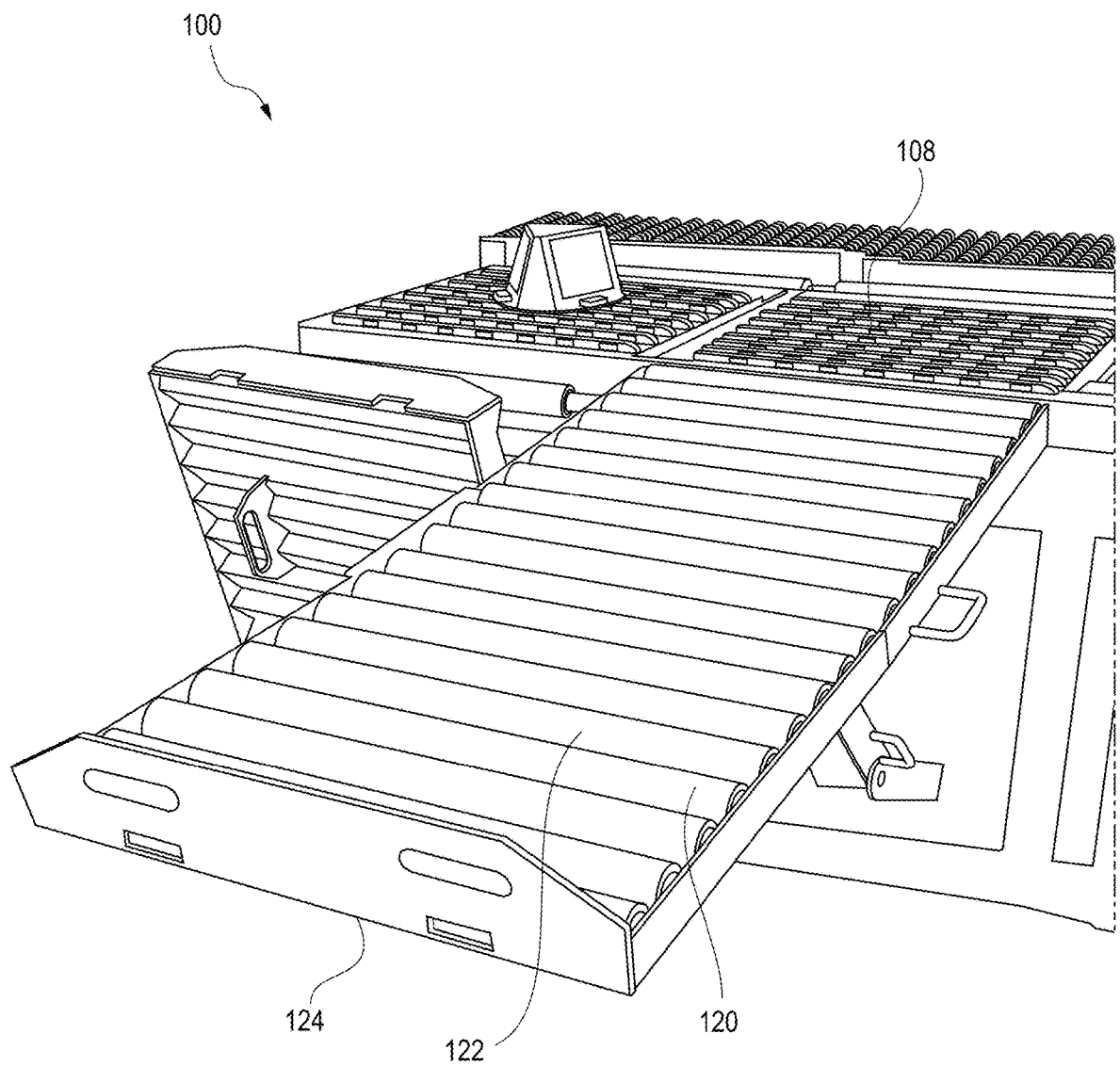
FIG. 3 is an enlarged perspective view of a portion of the conveyor assembly of FIG. 1.

Referring to FIGS. 1-3, there is shown a conveyor assembly 100 for sorting merchandise items. It is generally contemplated that the conveyor assembly 100 includes a number of sortation modules 102 that are mobile and can be readily stored when the conveyor assembly 100 is in a disassembled state. When a shipment of merchandise is received, these sortation modules 102 can then be readily assembled and arranged in any desired order. Following assembly, the specific position of each sortation module 102 is determined, and each sortation module is assigned a unique IP address corresponding to its position in the assembled chain.

As shown in FIG. 1, the conveyor assembly 100 includes a merchandise identification module 104 configured to receive identifying information about merchandise items to be sorted by the conveyor assembly 100. It is generally contemplated that each merchandise item includes some form of identifying information, such as a barcode or other identification label. The unsorted merchandise item is preferably deposited on an input set of rollers 106 of the conveyor assembly 100 in an orientation (such as right side up) such that the merchandise identification module 104 can scan or read each unsorted merchandise item. As can be seen, in one particular form, the merchandise identification module 104 may be a scan tunnel (or scan arm) positioned above or adjacent the input set of rollers 106 to the conveyor assembly 100. Further, as described below, in this particular form, a control circuit of the conveyor assembly 100 may also be disposed in the scan tunnel or arm. It should be understood, however, that the illustrated merchandise identification module 104 is simply one non-limiting example and that other types of modules may be used. Further, the input rollers 106 also are simply an illustrative example and are not required in the conveyor assembly 100.

In addition, as shown in FIGS. 1-3, the conveyor assembly 100 includes multiple sortation modules 102 for moving and sorting the merchandise items that are preferably identical and interchangeable with one another. Each sortation module 102 includes a multi-directional sorting portion 108 with a first set of rollers 110 configured to propel merchandise items in a first direction and a second set of rollers 112 configured to divert merchandise items in a second direction. In FIG. 1, the first direction is along the axial direction A of the conveyor assembly chain, and the second direction is in the direction B that is perpendicular to the axial direction A. In one preferred form, when energized, either the first or second set of rollers 110, 112 will elevate to either continue the merchandise item moving in the first direction or divert it to move in the second direction.

When diverted in the second direction, the merchandise item may be diverted along one of two wings. Depending on the direction of the rotation of the second set of rollers 112 (clockwise or counterclockwise), the merchandise item will be directed along one of the two wings. Each sortation module 102 also includes a first wing 114 adjacent the sorting portion 108 and comprising a third set of rollers 116 configured to divert first merchandise items to a first sortation destination 118. In other words, as the merchandise item moves downstream from the merchandise identification module 104, it may be diverted to the left, as shown in FIG. 1. Each sortation module 102 further includes a second wing 120 adjacent the sorting portion 108 and comprising a fourth set of rollers 122 configured to divert merchandise items to a second sortation destination 124. In other words, as the merchandise item moves downstream from the merchandise identification module 104, it may be diverted to the right, as shown in FIG. 1. Further, as can be seen in FIGS. 1-3, the wings 114, 120 are preferably collapsible or foldable so that the sortation module 102 is compact and readily storable when not in use.

Accordingly, in one aspect, this disclosure is directed generally to a conveyor assembly 100 that is made up of a number of separate, interchangeable modules 102. The modules 102 may be disassembled from one another and may be reassembled to form an overall conveyor assembly 100 having multiple shapes and configurations. So, initially, prior to sortation, the conveyor assembly 100 will be in a first, disassembled state of sortation modules 102 in which at least one of the sortation modules 102 is not linked to another sortation module 102. In one form, it is generally contemplated that all of the sortation modules 102 will be separate and unlinked to one another when in a disassembled state (so as to facilitate storage). Subsequently, when sortation is to be undertaken, the conveyor assembly 100 will be in a second, assembled state of sortation modules 102 in which the sortation modules 102 are coupled to one another to define a chain of sortation modules 102.

As addressed further below, when sortation is to be undertaken, the conveyor assembly 100 dynamically identifies the downstream modules 102 and then assigns an address for each module 102, and the modules 102 will operate correctly in any order following disassembly and reassembly. The conveyor assembly 100 will dynamically assign the role of each module 102 based upon the module's physical position within the "train," or chain, and the conveyor assembly 100 will self-sense where each module 102 is located. The conveyor assembly 100 assigns the modules 102 their roles, such as: first module position is for destination lanes 1 and 2; second module position is for destination lanes 3 and 4, etc. In one form, the conveyor assembly 100 assigns a first IP address to the closest downstream module 102 and a second, higher IP address to the second downstream module 102. In this way, the conveyor assembly 100 can determine the relative locations of the modules 102 and then assign roles based upon these locations.

Figure 4:
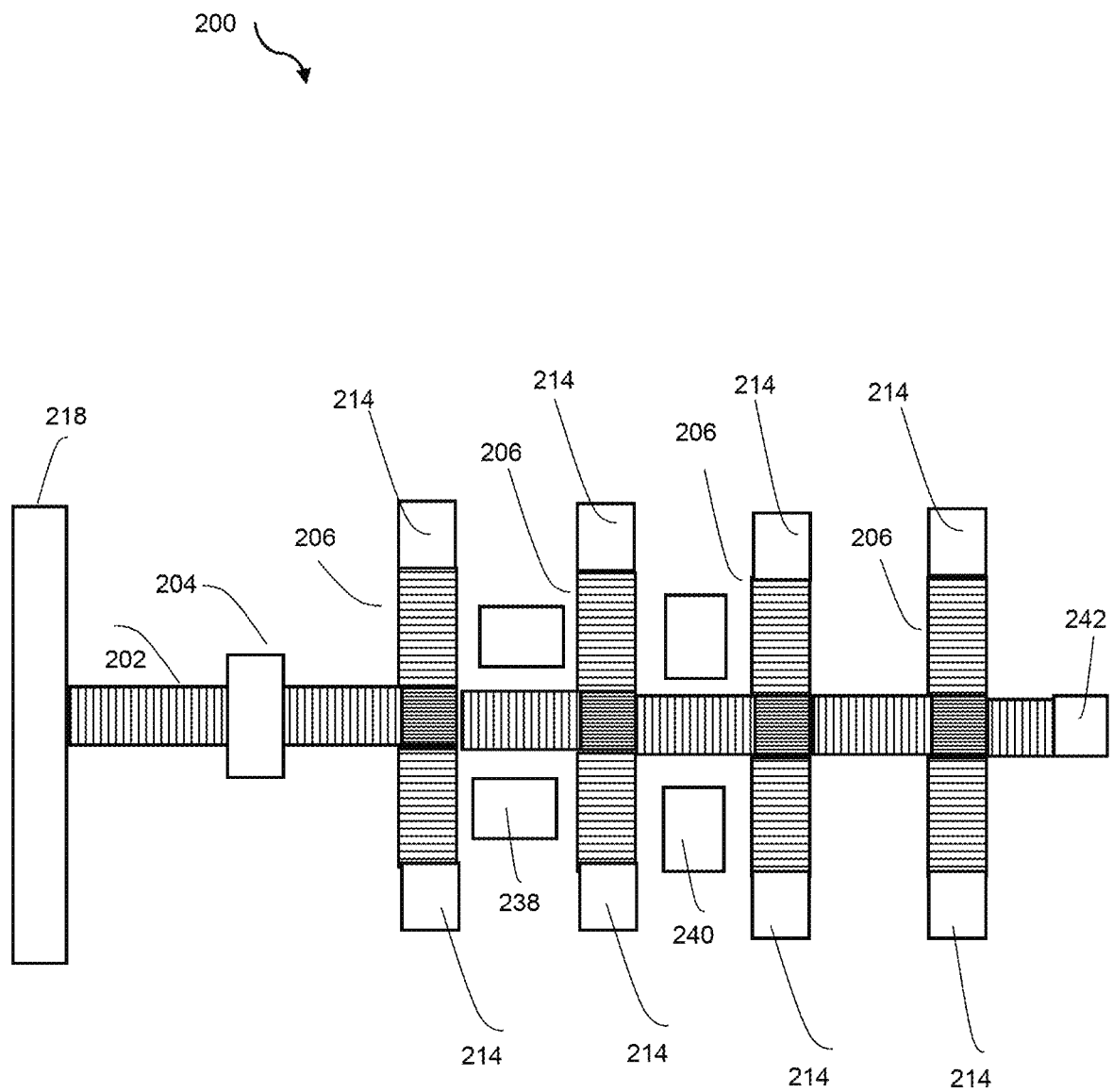
FIG. 4 is a schematic diagram of a conveyor assembly in accordance with some embodiments.
Figure 5:
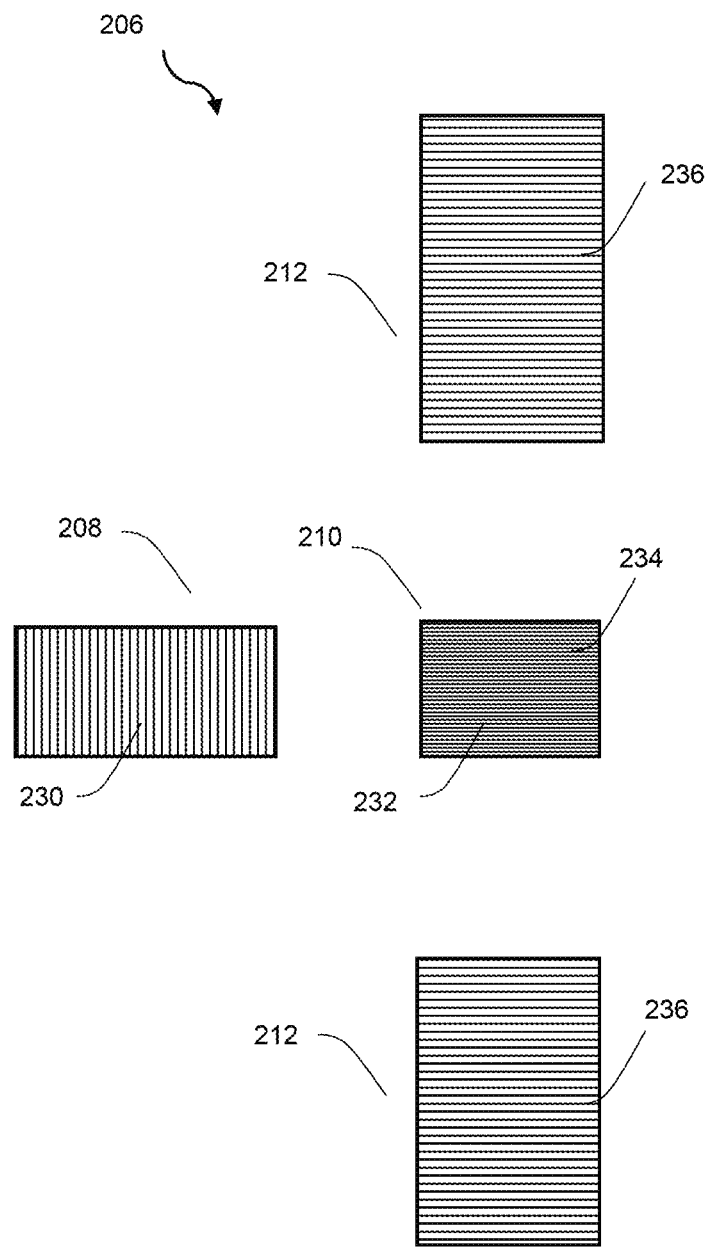
FIG. 5 is a schematic diagram of portions of a sortation module in accordance with some embodiments.
Figure 6:
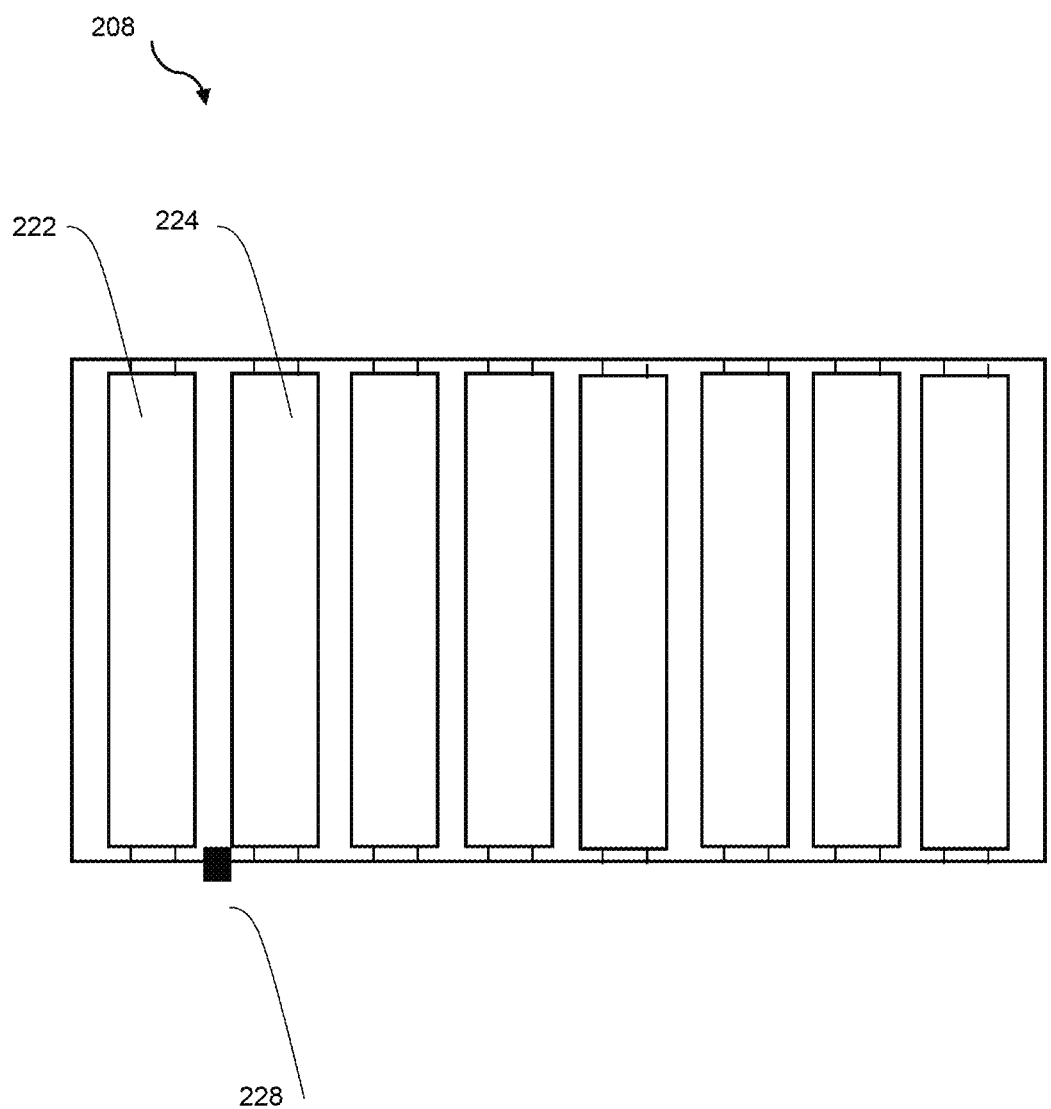
FIG. 6 is a schematic diagram of rollers of a sortation module in accordance with some embodiments.

Referring to FIG. 4, there is shown a schematic representation of an exemplary conveyor assembly 200 and components thereof. The conveyor assembly 200 is composed of various modules, and in one form, it may include an input set of rollers 202, a merchandise identification module 204, and a plurality of sortation modules 206 (FIG. 4 shows four sortation modules 206). The input set of rollers 202, and rollers on the modules 204 and 206, may collectively define the conveying surface of the conveyor assembly 200. In this form, products/merchandise in cases (or other containers) may be unloaded from a delivery vehicle at a delivery location 218 (such as at the loading dock of a shopping facility) and may be deposited on the input set of rollers 202. The input set of rollers 202 may be coupled to or positioned adjacent to the merchandise identification module 204. In another form, multiple delivery vehicles may be unloaded simultaneously, and the input set of rollers 202 may serve as a way to funnel the products so that only one product passes through the merchandise identification module 204 at a time. In another form, the conveyor assembly 200 may not include an input set of rollers 202 at all, and products may instead be unloaded directly from a delivery vehicle at the merchandise identification module 204 one at a time.

So, in one form, it is generally contemplated that the products in a shipment to the shopping facility will be unloaded from a delivery vehicle and placed on the conveyor assembly 200. The cases may pass through the merchandise identification module 204 and may have identification labels positioned and oriented on the cases so as to be read by the merchandise identification module 204. When passing through the module 204, the product will be identified and sorted along the conveyor assembly 200 to one of several destination lanes/areas 214, pursuant to any of various adjustable sortation criteria. In some forms, a merchandise identification module 204 is not required at all. Instead, in some forms, a hand scanner may be used to identify the product, and the product may then be loaded on the sortation modules 206 or a conveyor portion to the first sortation module 206.

If present, the merchandise identification module 204 generally reads identification data from an identification label disposed on a product passing through or adjacent the module 204. The merchandise identification module 204 may include one or more of any of various sorts of readers suitable for reading various types of labels, including a bar code reader, an RFID reader, an NFC reader, a laser imager, an optical sensor, an image processor, or a text capture device. Generally, the label and product may have to be oriented in a certain configuration, such as facing upwardly and extending horizontally, so as to be readable by the reader. In addition, the merchandise identification module 204 may include multiple readers that are configured to read various orientations of the labels. Alternatively, some types of readers may not be limited by the orientation of the label.

In one form, the merchandise identification module 204 may be in the shape of a scan tunnel or arm. The merchandise identification module 204 may include a plurality of rollers for moving the products through the module 204. Further, at least one of the rollers may be a motor powered roller in order to propel the products through the module 204. The merchandise identification module 204 may also include support wheels, which facilitate mobility and storage of the module 204 when the conveyor assembly 200 is not in use. As should be evident, the merchandise identification module 204 may be any of various shapes, dimensions, and types.

As the products pass through the module 204, the product identification label is read and the product is identified. As used herein, the phrase product identification label refers broadly to any sort of product identifier, such as, for example, graphics that are machine readable. Additional data regarding the product may also be included on the label and may be read by the module 204, as addressed further below. This identification data (and any additional data) may be used in the sortation process to determine a destination area 214 (or destination lane 214) for the product, as addressed below.

In turn, the merchandise identification module 204 is coupled to a sortation module 206. Each sortation module 206 is then coupled to another sortation module 206 to form a sequential arrangement of modules 206. The modules 204 and 206 may be coupled in any appropriate manner. The number of sortation modules 206 may be selected so as to fit within the size of space available to the conveyor assembly 200, and thereby, the conveyor assembly 200 is adjustable in size and orientation by the addition or subtraction of one or more modules 206.

In one form, the sortation modules 206 are generally identical and interchangeable. Each sortation module 206 may include a travel portion 208, a multi-directional sorting portion 210, and a wing 212. The travel portion 208 may be uni-directional and include a plurality of rollers 230 configured to propel the product in a first (or forward) direction along the rollers. The travel portion 208 is optional and need not be included in the sortation module 206 (see, for example, sortation module 102 in FIGS. 1-3). The shape of the sortation module 206 may be adjusted to accommodate space limitations. For example, the sortation module 102 need not include a travel portion 208, may be T-shaped with two wings 212, or may be L-shaped with one of the wings 212 folded down or removed.

In one form, the sorting portion 210 is multi-directional and may include a first set of rollers 232 configured to propel the product in the first (or forward) direction and a second set of rollers 234 to divert the product in a second direction (or sideways) to a sortation destination area 214. In one form, it is contemplated that a controller may cause the second set of rollers to "pop up," or elevate, when a product is to be diverted to a destination area. Further, it is generally contemplated that there will be two destination areas 214 for each sorting portion 210 (one to the left and one to the right), and the second set of rollers 234 are rotatable in either a clockwise or counterclockwise manner so as to divert the product to one of these two destination areas 214. If the product is to proceed in the first (or forward) direction, it is propelled in that direction by the first set of rollers 232, and the second set of rollers 234 do not "pop up."

In FIG. 4, the sortation module 206 is shown with the travel portion 208 arranged before the sorting portion 210. However, it should be understood that this arrangement may be reversed so that the product reaches the sorting portion 210 and may then proceed in any one of three directions, i.e., straight along the travel portion 208 or sideways along one of the wings 212. In some instances, this arrangement may have the advantage of provided for three destination areas 214 (rather than just two). Further, as addressed above, the travel portion 208 may be omitted entirely (or may be collapsible when not in use).

In summary, the sorting portion 210 can sort products in multiple directions (e.g., left or right). In some implementations, each sorting portion 210 can include a first set rollers 232 to allow products to travel in a first direction along the conveyor assembly 200, and separate pop-up rollers 234 that are activated to direct the product in one of the multiple directions. Sensors can detect when the product is approaching and/or on the sortation module 206, and the controller can activate the sortation module 206 (e.g., signal to raise the pop-up rollers 234) and a direction to route. A sensor can detect when the product is off of the sortation module 206 to deactivate the sorting portion 210 (e.g., a photo-eye to cause the pop-up rollers to lower). When the product does not need to be diverted, the product may pass straight onto a subsequent outbound/downstream sortation module 206.

The wing 212 includes a plurality of rollers 236 and connects the sorting portion 210 to a destination area 214. It is generally contemplated that there may be two wings 212 for each sortation module 206 with each wing 212 ending in a destination area 214. Further, each wing 212 is preferably adjustable in length to accommodate different space limitations for the conveyor assembly 200. It is also preferably collapsible to facilitate storage of the sortation module 206 when not in use. For example, the wings 212 may be foldable with respect to the sorting portion 210, and/or the travel portion 208 may be foldable with respect to the sorting portion 210. Further, the sortation module 206 may include support wheels to also facilitate storage of the module 206.

In one form, the destination areas 214 may simply be the ends of the wings 212. For example, prior to sorting, pallets 238 and carts 240 may be arranged adjacent to the ends of the wings 212, and when the sorting is completed, the products in each destination area 214 may be moved to a corresponding pallet 238 or cart 240. Alternatively, the destination areas 214 may be the pallets 238 or carts 240 themselves and may be entirely separate from the wings 212.

In one form, the conveyor assembly 200 may also include a non-sortation destination area 242. This non-sortation destination 242 may be configured to receive an unsorted merchandise item that could not be identified by the merchandise identification module 204 or that could not be located in the merchandise database. So, for example, if a merchandise item cannot be identified, it may simply proceed downstream all the way to the non-sortation destination area/lane 242 without being diverted into any of the intervening sortation destinations 214.

The conveyor assembly 200 may be composed of various numbers and arrangements of rollers 222 (including powered rollers and/or non-powered rollers). Non-powered rollers may be coupled to powered rollers in some way, such as by a belt. In one form, it is contemplated that each sortation module 206 includes at least one powered roller 224 in both the first and second directions. For example, at least one roller of the first set of rollers 232 is preferably a motor powered roller and at least one roller of the second set of rollers 234 is preferably a motor powered roller. On the other hand, it is generally contemplated that the rollers 236 in the two wings 212 need not include motor powered rollers. Some or all of the motor powered rollers 224 may be operated at an adjustable rotation speed to maintain a minimum distance between adjacent products. The conveyor assembly 200 may maintain a minimum distance between adjacent products through the use of a plurality of sensors 228 disposed at predetermined locations on the plurality of sortation modules 206 to detect positions of the products traveling along the sortation modules 206. In one form, the sensors 228 may be optical sensors (or any of various other sensor types) spaced equidistantly along the conveyor assembly 200 that detect products.

In one form, there is disclosed a conveyor assembly 200 having sortation modules 206 that are readily reconfigurable to adjust to changing or disparate space limitations. So, for example, the conveyor assembly 200 may be reconfigured for use in the back room of a shopping facility with changing space limitations. Alternatively, the conveyor assembly 200 may be the basis for a standardized model used in different back rooms with different space limitations and that may be reconfigured differently for each shopping facility. This conveyor assembly 200 is a scaled down model and is configurable. In the shopping facility context, space is often at a premium in the back rooms of stores, so the modular nature is an advantage.

The modular conveyor assembly 200 enables multiple different sortation modules 206 to be coupled together to form a conveyor assembly 200 intended to be utilized with a product sorting system that autonomously sorts products being unloaded from delivery trucks at a shopping facility. The sortation modules 206 can easily be decoupled to allow for convenient storage and to allow the conveyor assembly 200 to be moved out of the way when not in use (e.g., in the back storage area of the shopping facility). As addressed further below, when the sortation modules 206 are coupled together, their positions can be automatically determined along the conveyor assembly 200 and/or relative to one or more other sortation modules 206 without manual inputs (e.g., if module A is supposed to be placed before module B, but is instead placed after module B, module A and module B will reconfigure sortation destinations). The sortation modules 206 need not be arranged in a specific order or arrangement of modules.

One advantage of the conveyor assembly 200 is that it tracks destination areas (or lanes) 214 even when one sortation module 206 is replaced or interchanged with another sortation module 206. More specifically, a control circuit 216 is able to track the positions of the sortation modules 206 and adjust the operation of the units accordingly to send products to the correct destination area (or zone) 214. In this context, the term control circuit (and the term controller) 216 refer broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 216 may be configured (for example, by using corresponding programming stored in a memory as will be well understood by those skilled in the art) to carry out one or more of the steps, actions, and/or functions described herein.

Figure 7A:
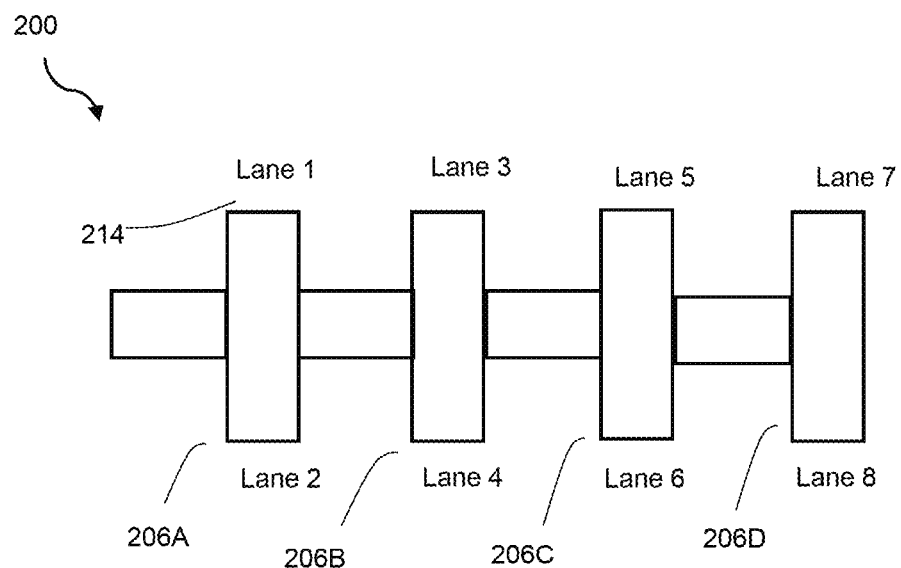
FIGS. 7A and 7B are schematic diagrams of a conveyor assembly in accordance with some embodiments.
Figure 7B:
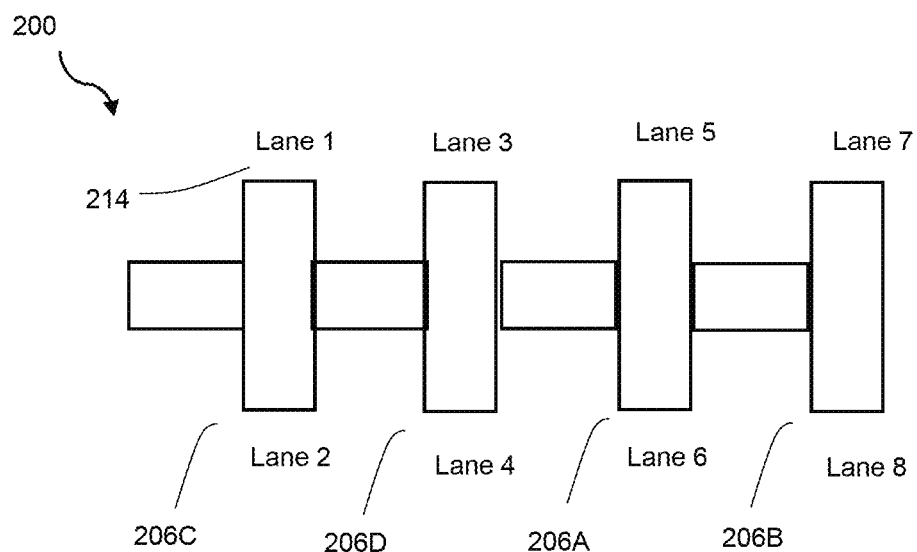

An example of the reconfigurability of the sortation modules 206 is shown in FIGS. 7A and 7B. FIG. 7A is a schematic diagram showing the four sortation modules 206A, B, C, D extending sequentially from left to right in a linear arrangement. In this form, there are a total of eight destination areas (or zones) with Lanes 1 and 2 corresponding to sortation module 206A, Lanes 3 and 4 corresponding to sortation module 206B, Lanes 5 and 6 corresponding to sortation module 206C, and Lanes 7 and 8 corresponding to sortation module 206 D. In FIG. 7B, the sortation modules have been rearranged so that they are in the following sequential order from left to right: 206C, 206D, 206A, and 206B. It is generally contemplated that, in preparation for each unloading option, the sortation modules 206 will be removed from a storage area where they may be arranged haphazardly. When they are set up for unloading, it is contemplated that they will be arranged in the desired space available for the conveyor assembly 200 without regard to how they have been arranged in past unloading operations. As can be seen in FIGS. 7A and 7B, it is contemplated that the assigned destination areas (or lanes) 214 will remain fixed or constant regardless of the new relative positions of the sortation modules 206.

It is also contemplated that the conveyor assembly 200 is arranged for automatic dynamic configuration based on a reduced number of modules. In one form, if a sortation module 206 becomes impaired, it can be replaced with a new functional sortation module 206. The sortation can then continue with the same number of destination areas/lanes 214. Alternative, if a replacement sortation module 206 is not available, the conveyor assembly 200 recognizes the reduced number of sortation modules 206 and can continue the sortation process with a reduced number of destination areas/lanes 214.

It is generally contemplated that the determination of the positions of the sortation modules 206 may be determined when the conveyor assembly 200 is energized for an unloading and sorting operation. In one form, it is contemplated that the control circuit 216 communicates with each sortation module 206A, 206B, 206C, and 206D to track the position of each sortation module. Alternatively, or in addition, it is contemplated that each sortation module 206A, 206B, 206C, and 206D may also communicate with other sortation modules to track the position of each sortation module relative to one another. As addressed below, the sortation modules 206 include separate controllers to facilitate the detection of their relative positions.

In one form, this disclosure describes the use of a control circuit 216. This control circuit 216 may be housed, at least in part, at or near the conveyor assembly 200 itself, such as inside the merchandise identification module 204. However, it is also contemplated that control may be handled remotely. In one example, the conveyor assembly 200 may include an input/output hub that communicates wirelessly with a shopping facility server facility or a cloud computing system using remote server(s). In this example, processing would occur remotely.

The determination of the presence and/or positions of the sortation modules 206 may be handled in various ways. One approach is to employ a master/slave architecture with two way communication. In one example, the control circuit 216 may query each sortation module 206, i.e., the control circuit 216 transmits a signal to each sortation module 206 and, in response, each sortation module 206 transmits a return signal. In other words, the conveyor assembly 200 may utilize a query/response model with the control circuit 216 making a query to each sortation module 206 and expecting a response from it to ascertain the position of the modules 206 installed in the conveyor assembly 200. Characteristics of these signals, or simply their presence, may be used by the control circuit 216 to determine the relative positions of the sortation modules 206, i.e., that sortation module 206B is downstream from sortation module 206A.

Alternatively, in another example, each sortation module 206 may be configured to automatically transmit a signal upon being energized. In other words, each sortation module 206 may self-detect its installation and position and announce its presence and position to the control circuit 216. This approach may rely on one-way communication to establish position. Optionally, this approach could have each sortation module 206 continue to transmit a signal at predetermined time intervals until receiving some sort of acknowledgment signal from the control circuit 216. In other words, if the sortation module 206 does not receive an acknowledge message back from the control circuit 216, the module 206 will wait a period of time (either random or fixed duration) and make another announcement attempt.

In another form, sensors or separate controllers of the sortation modules 206 may be "daisy chained" together so that the each sortation module 206 communicates with the other sortation modules 206, i.e., sortation module 206B "knows" that it is downstream of sortation module 206A. In other words, separate controllers may provide some sort of query/response signals or announcement signal amongst each other to determine relative positions. This approach may also involve communications and signals to the control circuit 216. Under any approach, this determination of relative position also enables the use of spare sortation modules 206 that can replace damaged or defective sortation modules, thereby minimizing the down time of the conveyor assembly 200.

Figure 8:
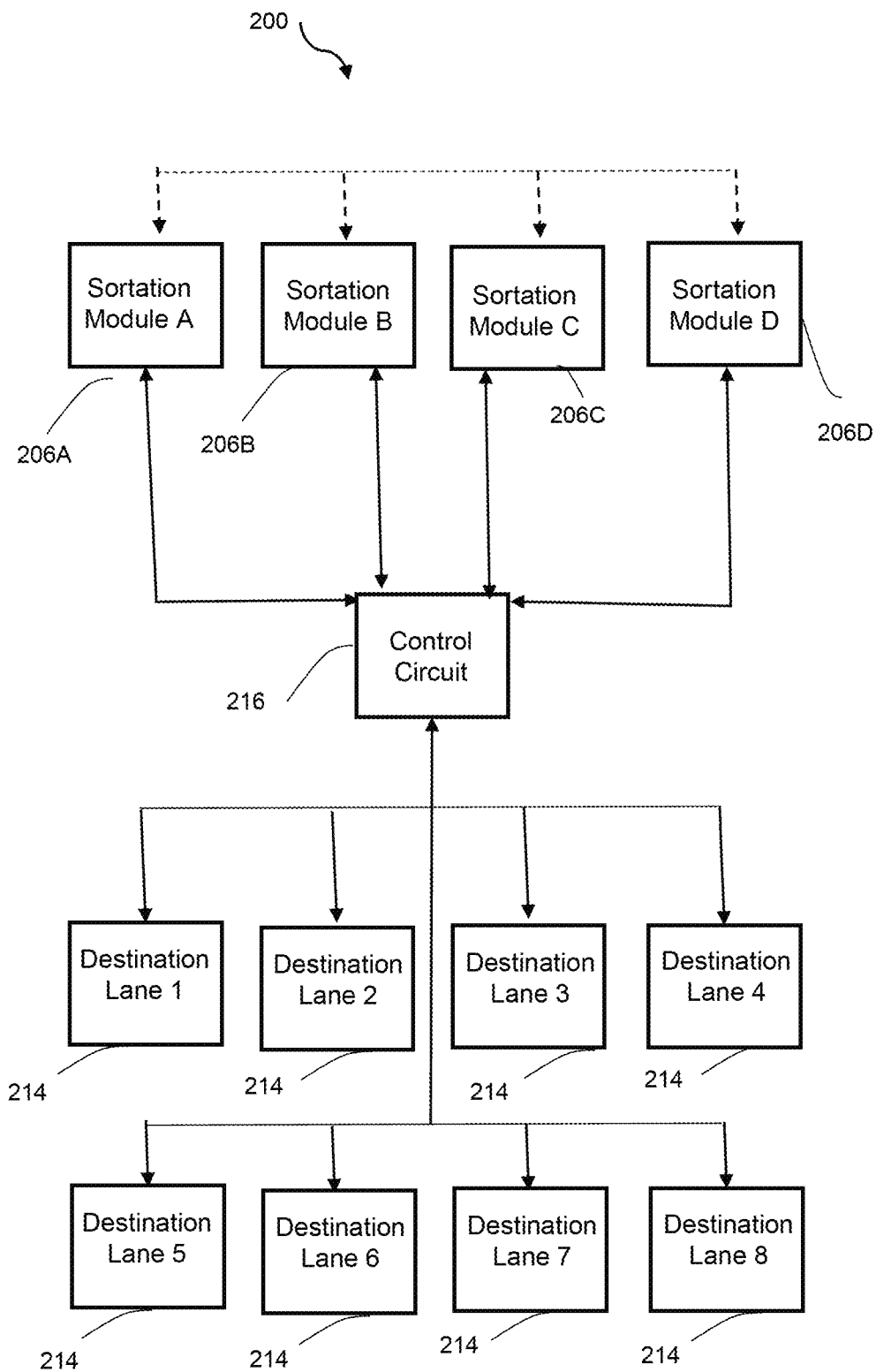
FIG. 8 is a block diagram in accordance with some embodiments.

FIG. 8 shows a block diagram showing various components of the exemplary conveyor assembly 200. In one form, the control circuit 216 may be in communication with several (in this example, four) sortation modules 206A-D. The control circuit 216 communicates with the sortation module 206A-D to track their relative positions. The control circuit 216 may receive input in the form of sortation criteria in which certain types of products are to be sorted to the same destination. The control circuit 216 may assign destination lanes 1 through 8 to the sortation modules 206A-D in the appropriate positions.

Figure 9:
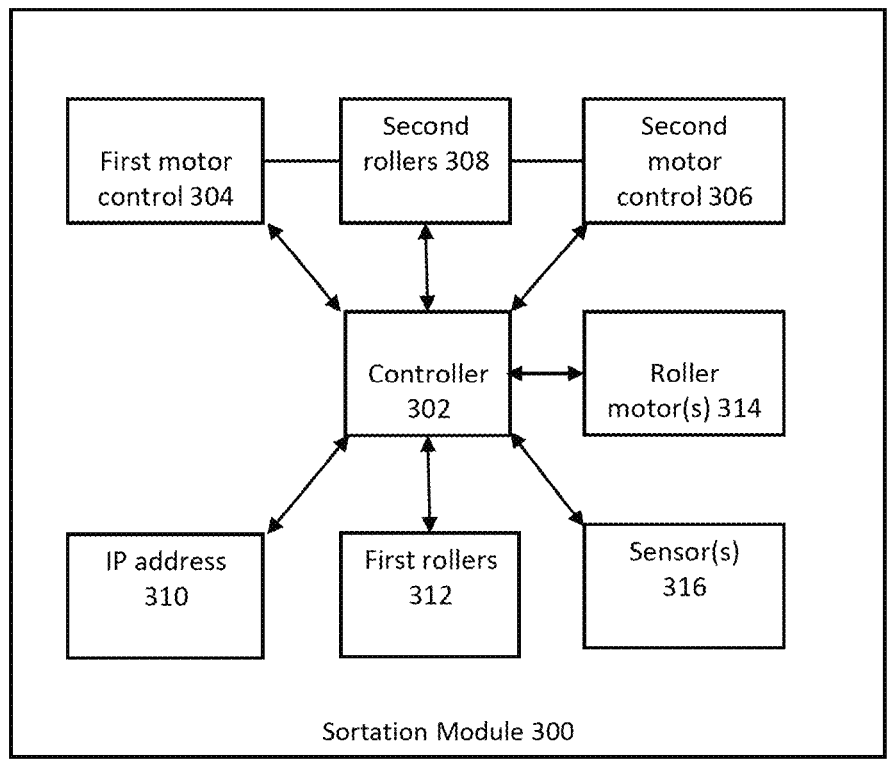
FIG. 9 is a block diagram in accordance with some embodiments.

Referring to FIG. 9, there is shown a sortation module 300, and the interaction of certain components of the module 300. In one form, the sortation module 300 incorporates much of the structure (such as, for example, the roller structure, the sorting portion 108, 210 and wings 114, 120, 212) described above with respect to sortation modules 102, 206. It should be understood that these structures constitute non-limiting examples and that other forms are also possible. FIG. 9 generally shows the interaction of the controller 302 with certain other components of the sortation module 300.

The sortation module 300 includes a controller 302 operatively coupled to the second set of rollers 112, 234 and configured to divert merchandise items along one of the first and second wings 114, 120, 212 to the first and second sortation destinations 118, 124, 214, respectively. It is contemplated that various types of conveyor controllers, such as, for example, controllers from Dematic and PulseRoller, may be configured for operation in sortation modules 300. In one form, the controller 302 of each sortation module 300 controls rotation of a powered roller to direct merchandise to a sortation destination. In this regard, the controller 302 of each sortation module 300 may include a first roller motor control portion 304 and a second roller motor control portion 306. The first roller motor control portion 304 is configured to control rotation of at least one of the second set of rollers 308 in a clockwise direction to divert merchandise items along the first wing 114 to the first sortation destination 118, and the second roller motor control portion 306 is configured to control rotation of at least one of the second set of rollers 308 in a counterclockwise direction to divert merchandise items along the second wing 120 to the second sortation destination 124. In addition, as addressed further below, the controller 302 of each sortation module 300 is configured to receive an IP address 310 corresponding to the sortation module 300.

It is also contemplated that the first set of rollers 312 may also include at least one powered roller to move merchandise items to the next downstream sortation module 300. It is generally contemplated that the controller 302 interacts with roller motor(s) 314 to advance merchandise items at a desired speed and minimum distance and in desired directions. Further, as addressed above, it is generally contemplated that the controller 302 interacts with sensor(s) 316 to detect the positions of merchandise items with respect to one another so as to divert them to appropriate sortation destinations.

Figure 10:
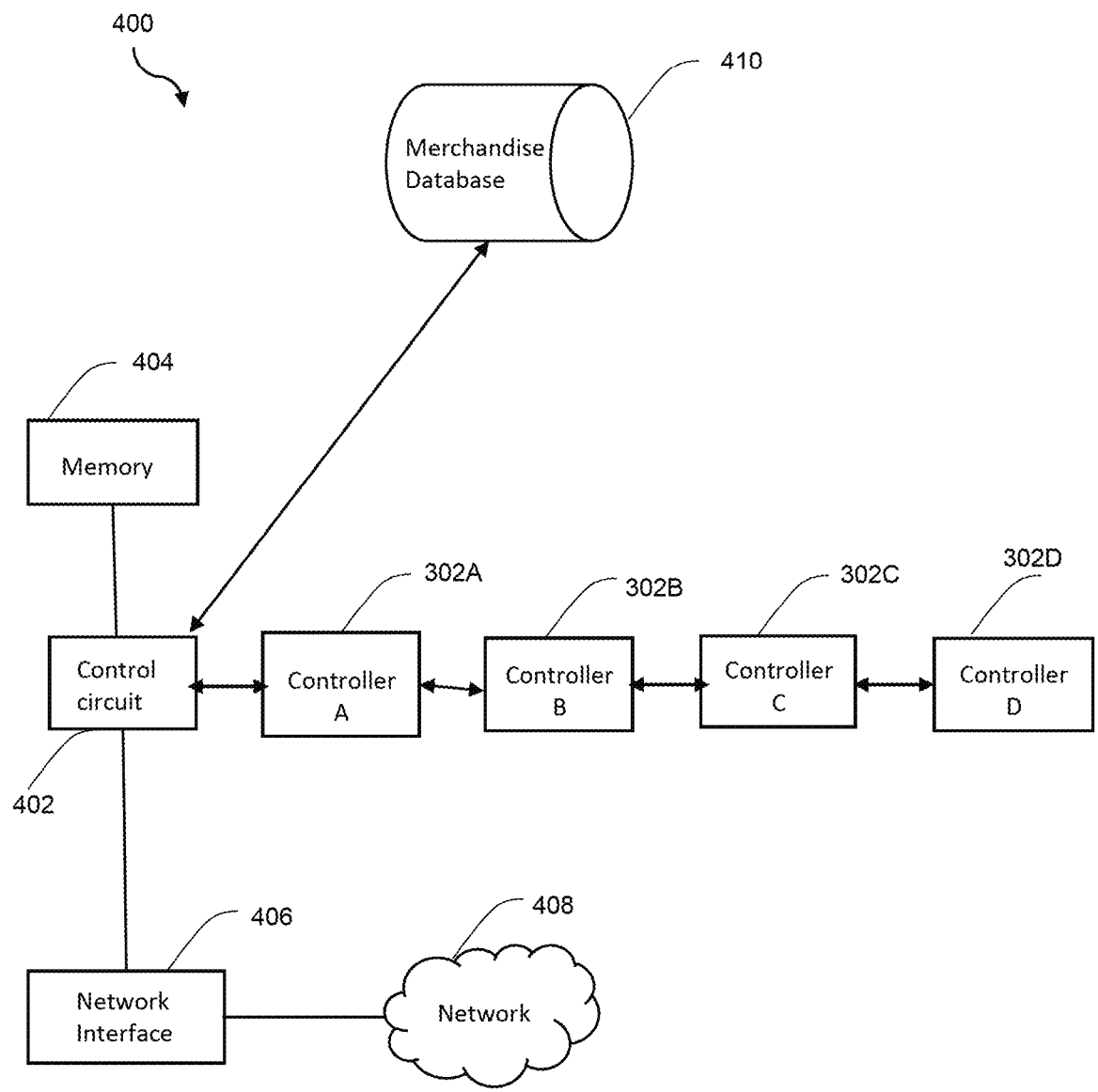
FIG. 10 is a block diagram in accordance with some embodiments.

Referring to FIG. 10, there is shown a conveyor assembly 400, and the interaction of the control circuit 402 and sortation modules 300 in the conveyor assembly 400. As described herein, the language "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 402 may be configured (for example, by using corresponding programming stored in a memory as will be well understood by those skilled in the art) to carry out one or more of the steps, actions, and/or functions described herein.

As shown in FIG. 10, the control circuit 402 may be coupled to a memory 404 and may be coupled to a network interface 406 and network(s) 408. The memory 404 can, for example, store non-transitorily computer instructions that cause the control circuit 402 to operate as described herein, when the instructions are executed, as is well known in the art. Further, the network interface 406 may enable the control circuit 402 to communicate with other elements (both internal and external to the conveyor assembly 400). This network interface 406 is well understood in the art. The network interface 406 can communicatively couple the control circuit 402 to whatever network or networks 408 may be appropriate for the circumstances. The control circuit 402 may be disposed, in part, in a merchandise identification module 104, 204 (and is communicatively coupled to the module 104, 204), may be in communication with the server of a shopping facility, and/or may be, in part, remote from the shopping facility. It may make use of cloud databases and/or operate in conjunction with a cloud computing platform.

The control circuit 402 is communicatively coupled to a merchandise database 410. The merchandise database 410 includes records corresponding to merchandise items to be sorted. It is generally contemplated that the merchandise records include characteristics of the merchandise item used to determine how to sort that merchandise. In other words, the merchandise database 410 contains one or more predetermined characteristics of merchandise items to be sorted, and the control circuit 402 assigns the sortation destination for the unsorted merchandise item to be sorted based on the one or more predetermined characteristics. In one simple example, each merchandise record might contain a specific sortation destination for each individual merchandise item. In other examples, each merchandise record may contain any of various characteristics (nature of the merchandise item (grocery, perishable, fruit, etc.), location of shelving in the store with that merchandise item, quantity of the merchandise item in inventory, etc.) that may be used to determine the sortation destination for that item.

The control circuit 402 is also coupled to each of the controllers 302 of the sortation modules 300 in the conveyor assembly 400. Initially, it is contemplated that the sortation modules 300 will be connected to one another sequentially and that the controllers (302A, 302B, 302C, 302D) will also be connected to one another in sequence (such as, for example, via cables). Upon power up, it is contemplated that the control circuit 402 and the sortation module controllers 302A, 302B, 302C, 302D will communicate with one another to determine the number of sortation modules 300 in the chain and to determine the relative positions of the sortation modules in the chain with respect to one another.

In this example, it is determined that there are four sortation modules; that controller 302A is upstream from the other controllers; that controller 302B is downstream of 302A but upstream of the remaining controllers 302C, 302D; that controller 302C is downstream of 302A, 302B but upstream of 302D; and that controller 302D is downstream of all of the other controllers.

Once the sortation modules 300 are coupled to one another and sortation is ready to begin, the control circuit 402 receives identifying information about an unsorted merchandise item to be sorted by the conveyor assembly 400 from the merchandise identification module 104, 204. It assigns a unique IP address to each sortation module 300 with each IP address corresponding to a position of each sortation module 300 in the chain of sortation modules 300 when assembled. Initially, it is contemplated that each sortation module 300 may include a haphazard IP address unrelated to its position in the chain, such as, for example, 100.200.300.0X.) However, once the control circuit 402 and controllers 302A, 302B, 302C, 302D are coupled to one another and following power up, it is contemplated that the control circuit 402 assigns a unique IP address to each sortation module in ascending or descending sequential order as one proceeds downstream from the merchandise identification module 104, 204. So, for example, the control circuit 402 may assign IP addresses in sequentially ascending order as follows: 100.200.300.01 corresponding to controller 302A; 100.200.300.02 corresponding to controller 302B; 100.200.300.03 corresponding to controller 302C; and 100.200.300.04 corresponding to controller 302D.

The control circuit 402 then proceeds with sortation. It determines a sortation destination 118, 124, 214 for the unsorted merchandise item to be sorted by the conveyor assembly 400 based on the merchandise database 410. It determines the sortation module 300 corresponding to the determined sortation destination 118, 124, 214. The control circuit 402 instructs instruct the controller 302A, 302B, 302C, 302D of the sortation module 300 corresponding to the determined sortation destination 118, 124, 214 to energize the second set of rollers 112, 234, 308 to divert the unsorted merchandise item to the determined sortation destination 118, 124, 214.

Once sortation is completed, the sortation modules 300 can be stored away in any desired arrangement. Then, during the next sortation operation, they can be rearranged in a different number and different order in the conveyor assembly chain. The conveyor assembly 400 is reconfigurable in any order. In other words, the conveyor assembly 400 includes a new, assembled state in which the sortation modules 300 have been reconfigured to different positions in the chain of sortation modules 300, and the control circuit 402 assigns a new IP address to each sortation module 300 depending on the sortation module's new position in the chain of sortation modules 300. The sortation modules 300 need not be in the same order and arrangement as in the previous sortation operation.

Further, if a sortation module 300 becomes non-functional or impaired in some manner, it can be replaced with a new sortation module 300. For example, assume during a sortation operation involving controller 302A, 302B, 302C, 302D that the second sortation module 300 corresponding to controller 302B stops working. The conveyor assembly 400 may be powered down, and the second sortation module may be decoupled from the chain and replaced with a fifth sortation module having a controller 302E. Once the fifth sortation module and controller 302E are hooked up in the chain and the conveyor assembly 400 is energized, the control circuit 402 and controllers 302A, 302E, 302C, 302D will communicate to determine the relative positions of the sortation modules and IP addresses will be assigned. Accordingly, the conveyor assembly 400 further includes another assembled state in which one of the sortation modules 300 in the chain of sortation modules 300 has been replaced with a new sortation module 300, and the controller 302E of the new sortation module 300 receives a new IP address corresponding to the new sortation module's position in the chain of sortation modules 300.

Figure 11:
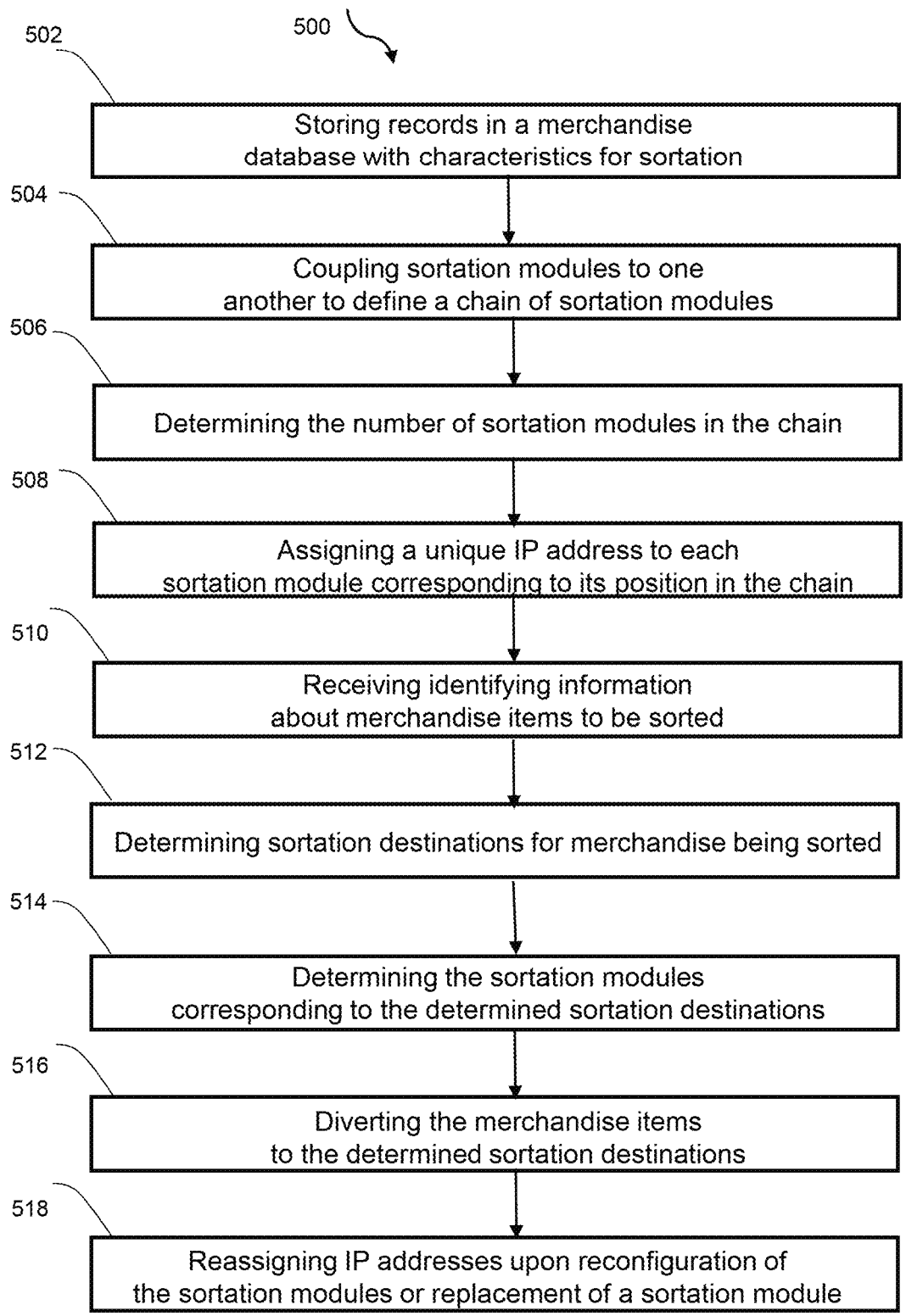
FIG. 11 is a flow diagram in accordance with some embodiments.

Referring to FIG. 11, there is shown a process 500 for sorting merchandise items using a conveyor assembly. It is generally contemplated that the process 500 may use some or all of the components of conveyor assemblies 100, 200, 400 described above, and the above description of conveyor assemblies 100, 200, 400 is incorporated herein. It should be understood generally, however, that the process 500 may be used with any of various types of conveyor assemblies sufficient to carry out the steps of the process described as follows.

At block 502, records are stored in a merchandise database with characteristics for sortation. It is generally contemplated that the merchandise database may be stored locally at the conveyor assembly structure or may be stored remotely (such as via a store server or cloud database). The merchandise records contain certain criteria for sortation. In a simple example, the records may contain a specific sortation destination for each merchandise item, while in other examples, the characteristic may be a more general characteristic that is used to determine the sortation destination (such as the nature of merchandise item, location of corresponding shelving in a store, location and/or quantity in inventory, etc.)

At block 504, sortation modules are coupled to one another to define a chain of sortation modules. It is generally contemplated that the sortation modules may be stored at a store or distribution center when not in use. When a sortation operation is to be performed, the sortation modules are coupled to one another to form a chain of a desired number and configuration of sortation modules. It is also contemplated that one of the sortation modules may be coupled to a merchandise identification module (near the upstream end of the chain).

At block 506, the number of sortation modules in the chain is determined. It is generally contemplated that a control circuit is connected to a controller for the most upstream sortation module, and the controllers for the various sortation modules are connected to one another in series. Once connected, the control circuit and the controllers communicate with one another to determine the number and relative positions of the sortation modules.

At block 508, a unique IP address is assigned to each sortation module corresponding to its position in the chain. It is generally contemplated that, prior to coupling and assembly, the sortation modules will each have some arbitrary IP address. Following assembly, they are each assigned a new IP address in ascending or descending sequential order as one proceeds either upstream or downstream along the chain of sortation modules.

At block 510, the sortation process at the conveyor assembly commences. It is generally contemplated that merchandise items are deposited on the conveyor assembly, such as following unloading from a delivery vehicle. Identifying information about the merchandise items to be sorted is received. In one form, it is generally contemplated that the merchandise identification module may scan or read labels on the merchandise items.

At block 512, sortation destinations are determined for the merchandise items being sorted. In one form, it is contemplated that the merchandise database may be accessed to determine the sortation criteria and to thereby determine the appropriate sortation destination for each merchandise item. At block 514, in turn, the sortation modules corresponding to those sortation destinations are determined.

At block 516, the merchandise items are then diverted to the appropriate sortation destinations. Each merchandise item moves along the conveyor assembly until it reaches the sortation module corresponding to its sortation destination. In one form, it is generally contemplated the controller for the sortation module energizes a motor powered roller in either a clockwise or counterclockwise direction to divert the merchandise item along one of two wings to the sortation destination.

At block 518, IP addresses are reassigned upon reconfiguration of the sortation modules or replacement of a sortation module. For example, once a sortation operation is completed, the sortation modules may be decoupled and stored away. Then, during the next sortation operation, they may be reassembled and reconfigured in a different order, and IP addresses are reassigned corresponding to the positions of the sortation modules. Alternatively, a sortation module may become non-functional so that it cannot be used for a sortation operation. The sortation module can be replaced with a new sortation module that will be assigned a new IP address when it is placed in the chain and coupled to other sortation modules.

Figure 12:
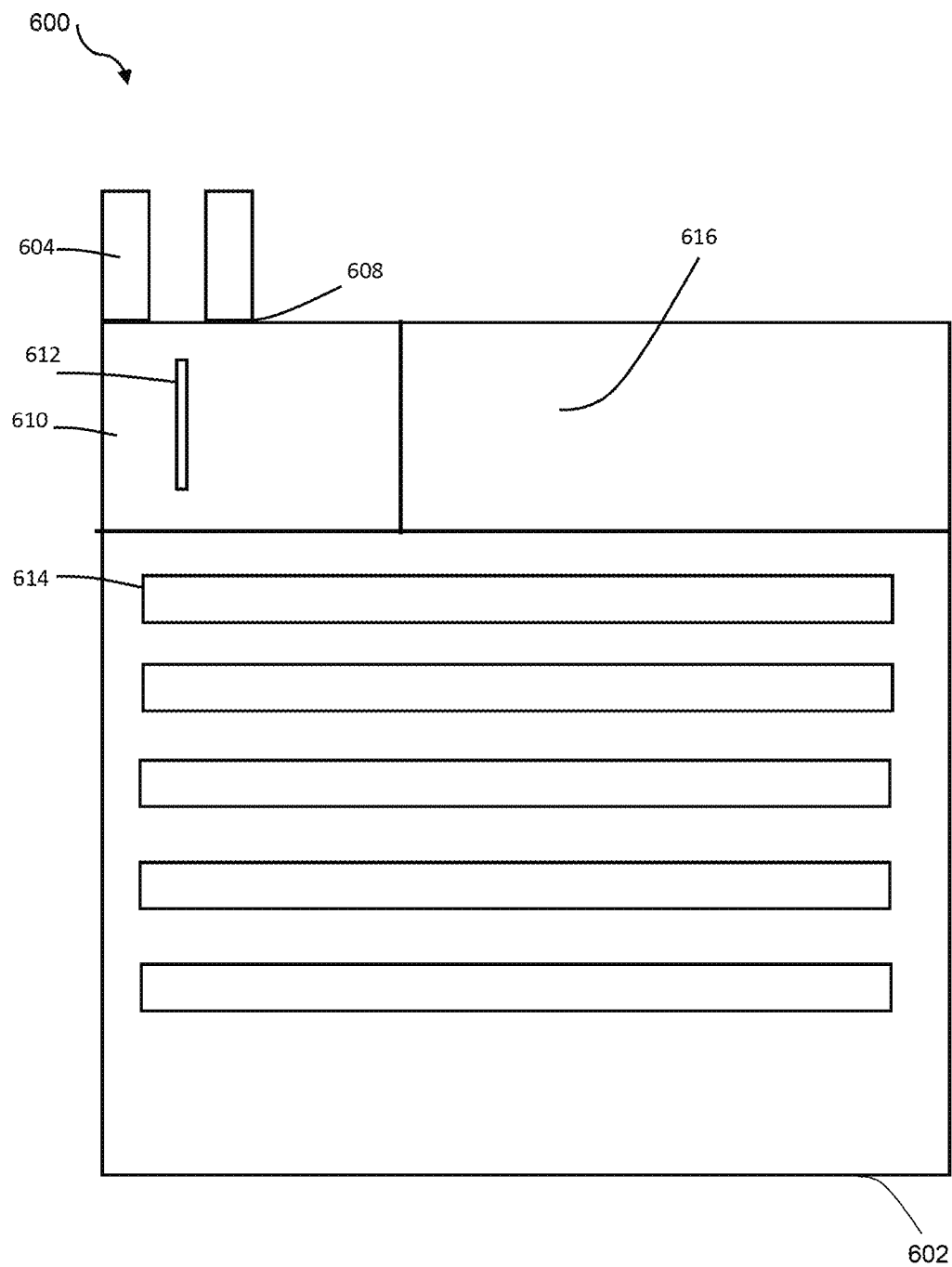
FIG. 12 is a schematic diagram in accordance with some embodiments.

The conveyor assemblies 100, 200, 400 and process 500 may be used in a variety of settings. In one particular form, referring to FIG. 12, it is contemplated that they may be used as part of a system 600 for receiving and sorting merchandise items shipped to a shopping facility 602 (such as, for example, to a retail store selling merchandise to the public). Delivery vehicles 604 arrive at the shopping facility 602 with deliveries of merchandise items for receipt by the shopping facility 602. The shopping facility 602 includes a delivery location 606 that is configured to receive the delivery of merchandise (such as, for example, a loading dock 608 at the shopping facility 602 for receiving the delivery vehicles 604 and a sorting area 610 (or non-public backroom area) in the shopping facility 602 for containing the conveyor assembly 612. The sortation operation using the conveyor assembly 612 (which may include some or all of the components of conveyor assemblies 100, 200, 400) may occur in this non-public backroom area. Following sortation, the merchandise items may be moved, for example, to shelving units 614 in the store or to an inventory storage area 616.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A conveyor assembly comprising:
a plurality of sortation modules configured to move and sort items, wherein each sortation module is configured to divert items to at least one sortation destination;
an assembled state of the plurality of sortation modules in which the sortation modules are coupled to one another to define a chain of sortation modules;
a control circuit communicatively coupled to each sortation module, the control circuit configured to:
assign a unique Internet Protocol (IP) address to each sortation module, each unique IP address corresponding to a position of each sortation module in the chain of sortation modules when in the assembled state;
determine a sortation destination for an unsorted item to be sorted;
determine a sortation module corresponding to the determined sortation destination; and
instruct the sortation module corresponding to the determined sortation destination to divert the unsorted item to the determined sortation destination.

2. The conveyor assembly of claim 1, wherein each sortation module comprises a sortation module portion with a set of rollers, at least one roller of the set of rollers being a motor powered roller.

3. The conveyor assembly of claim 1, wherein:
each sortation module comprises a first roller motor control portion and a second roller motor control portion;
the first roller motor control portion configured to control rotation of at least one roller of a set of rollers in a clockwise direction to divert items to a first sortation destination; and
the second roller motor control portion configured to control rotation of the at least one roller of the set of rollers in a counterclockwise direction to divert items to a second sortation destination.

4. The conveyor assembly of claim 1, wherein:
the control circuit is configured to assign the unique IP addresses to the plurality of sortation modules in ascending or descending sequential order as one proceeds in a direction along the chain of sortation modules.

5. The conveyor assembly of claim 1 further comprising:
a reassembled state in which the plurality of sortation modules have been reconfigured to different relative positions in the chain of sortation modules than in the assembled state;
the control circuit assigning a new IP address to each sortation module depending on a new position of each sortation module in the chain of sortation modules.

6. The conveyor assembly of claim 1 further comprising:
a newly assembled state in which one of the plurality of sortation modules in the chain of sortation modules has been replaced with a new sortation module relative to the assembled state;
the new sortation module receiving a new IP address corresponding to a position of the new sortation module in the chain of sortation modules.

7. The conveyor assembly of claim 1, wherein:
the control circuit is configured to communicate with each sortation module to determine the number and relative positions of the sortation modules in the chain with respect to one another.

8. The conveyor assembly of claim 1, wherein:
the control circuit assigns the sortation destination for the unsorted item to be sorted based on one or more predetermined characteristics of the unsorted item obtained from a merchandise database.

9. The conveyor assembly of claim 1, further comprising:
a scanner including a scan tunnel or arm positioned above or adjacent an input set of rollers, the control circuit being disposed, at least in part, in the scan tunnel or arm.

10. The conveyor assembly of claim 1, further comprising:
a non-sortation destination configured to receive an unsorted item that could not be identified by a scanner or that could not be located in a merchandise database.

11. The conveyor assembly of claim 1, wherein each sortation module comprises a controller configured to divert merchandise items to the at least one sortation destination and configured to receive the IP address corresponding to the sortation module.

12. A method of sorting items comprising:
coupling a plurality of sortation modules to one another to define a chain of sortation modules in an assembled state;
by the plurality of sortation modules, moving and sorting items, each sortation module being configured to divert items to at least one sortation destination;
by a control circuit communicatively coupled to each sortation module:
assigning a unique Internet Protocol (IP) address to each sortation module, each IP address corresponding to a position of each sortation module in the chain of sortation modules when in the assembled state;
determining a sortation destination for an unsorted item to be sorted;
determining a sortation module corresponding to the determined sortation destination; and
instructing the sortation module corresponding to the determined sortation destination to divert the unsorted item to the determined sortation destination.

13. The method of claim 12, wherein each sortation module comprises a first roller motor control portion and a second roller motor control portion, the method further comprising:
by the first roller motor control portion, causing rotation of at least one roller of a set of rollers in a clockwise direction to divert items to a first sortation destination; and
by the second roller motor control portion, causing rotation of the at least one roller of the set of rollers in a counterclockwise direction to divert items to a second sortation destination.

14. The method of claim 12, further comprising:
by the control circuit, assigning the unique IP addresses to the sortation modules in ascending or descending sequential order as one proceeds in a direction along the chain of sortation modules.

15. The method of claim 12 further comprising:
reassembling the plurality of sortation modules to different relative positions in the chain of sortation modules than in the assembled state; and
by the control circuit, assigning a new IP address to each sortation module depending on a new position of each sortation module in the chain of sortation modules.

16. The method of claim 12 further comprising:
replacing one of the plurality of sortation modules in the chain of sortation modules with a new sortation module; and
by the new sortation module, receiving a new IP address corresponding to a position of the new sortation module in the chain of sortation modules.

17. The method of claim 12, further comprising:
by the control circuit, communicating with each sortation module to determine the number and relative positions of the sortation modules in the chain with respect to one another.

18. The method of claim 12, further comprising:
by the control circuit, assigning the sortation destination for the unsorted item to be sorted based on one or more predetermined characteristics of the unsorted item obtained from a merchandise database.

19. The method of claim 12, further comprising:
receiving, at a non-sortation destination, an unsorted item that could not be identified by a scanner or that could not be located in a merchandise database.

20. A system for receiving and sorting items shipped to shopping facilities, the system comprising:
a shopping facility containing a plurality of items;
a delivery of items received at the shopping facility; and
a conveyor assembly at the shopping facility, the conveyor assembly comprising:
a plurality of sortation modules configured to move and sort items, wherein each sortation module is configured to divert items to at least one sortation destination;
an assembled state of the plurality of sortation modules in which the sortation modules are coupled to one another to define a chain of sortation modules;
a control circuit communicatively coupled to each sortation module, the control circuit configured to:
assign a unique Internet Protocol (IP) address to each sortation module, each unique IP address corresponding to a position of each sortation module in the chain of sortation modules when in the assembled state;
determine a sortation destination for an unsorted item to be sorted;
determine a sortation module corresponding to the determined sortation destination; and
instruct the sortation module corresponding to the determined sortation destination to divert the unsorted item to the determined sortation destination.

* * * * *